(12) United States Patent
Clark et al.

(10) Patent No.: US 11,174,072 B2
(45) Date of Patent: Nov. 16, 2021

(54) BAKERY TRAY ASSEMBLY

(71) Applicant: Rehrig Pacific Company, Los Angeles, CA (US)

(72) Inventors: Suzanne Whitfield Clark, Santa Monica, CA (US); Jon P. Hassell, Atlanta, GA (US); Dane Gin Mun Kalinowski, Foothill Ranch, CA (US)

(73) Assignee: REHRIG PACIFIC COMPANY, Los Angeles, CA (US)

( * ) Notice: Subject to any disclaimer, the term of this patent is extended or adjusted under 35 U.S.C. 154(b) by 678 days.

(21) Appl. No.: 15/943,989

(22) Filed: Apr. 3, 2018

(65) Prior Publication Data

US 2018/0282020 A1    Oct. 4, 2018

Related U.S. Application Data

(60) Provisional application No. 62/480,957, filed on Apr. 3, 2017.

(51) Int. Cl.
| | | |
|---|---|---|
| *B62B 3/16* | (2006.01) | |
| *B65D 21/02* | (2006.01) | |
| *B62B 3/00* | (2006.01) | |
| *B65D 1/38* | (2006.01) | |
| *B65D 6/08* | (2006.01) | |
| *B62B 5/00* | (2006.01) | |
| *B65D 85/36* | (2006.01) | |

(52) U.S. Cl.
CPC .......... *B65D 21/0215* (2013.01); *B62B 3/006* (2013.01); *B62B 3/16* (2013.01); *B62B 5/0093* (2013.01); *B65D 1/38* (2013.01); *B65D 11/14* (2013.01); *B65D 21/0213* (2013.01); *B65D 85/36* (2013.01); *B65D 2203/00* (2013.01)

(58) Field of Classification Search
CPC ...... B65D 21/0215; B65D 1/38; B65D 11/14; B65D 21/0213; B65D 85/36; B65D 2203/00; B62B 3/006; B62B 3/16; B62B 5/0093
USPC ....................................................... 28/79.11
See application file for complete search history.

(56) References Cited

U.S. PATENT DOCUMENTS

| | | | | |
|---|---|---|---|---|
| 4,203,609 | A * | 5/1980 | Mitchell ................ | B62D 13/04 108/55.3 |
| 5,876,049 | A * | 3/1999 | Spear ........................ | B62B 3/02 280/33.998 |
| 6,338,316 | B1 | 1/2002 | Weaver | |
| 6,979,005 | B1 * | 12/2005 | McLerran ................ | B62B 3/00 108/53.1 |
| 7,059,617 | B1 * | 6/2006 | Verna .................... | B62B 5/0083 280/79.3 |
| 9,061,693 | B2 | 6/2015 | Hassell | |
| 9,376,132 | B1 * | 6/2016 | Cudney .................... | B62B 3/16 |

(Continued)

FOREIGN PATENT DOCUMENTS

JP            416792        10/2008

*Primary Examiner* — James A Shriver, II
*Assistant Examiner* — Hilary L Johns
(74) *Attorney, Agent, or Firm* — Carlson, Gaskey & Olds, P.C.

(57) ABSTRACT

A tray includes a base. A first pair of opposing walls extend upwardly from the base. A second pair of opposing walls extend upwardly from the base. At least one high stack indicia and at least one low stack indicia are located on at least one of the first pair of walls and the second pair of walls.

20 Claims, 22 Drawing Sheets

(56) References Cited

U.S. PATENT DOCUMENTS

| | | | |
|---|---|---|---|
| 2003/0205877 A1* | 11/2003 | Verna et al. | B62B 3/004 |
| | | | 280/79.11 |
| 2003/0213878 A1* | 11/2003 | Stahl | B62B 3/1476 |
| | | | 248/129 |
| 2005/0006861 A1* | 1/2005 | Dubois | B62B 3/16 |
| | | | 280/33.998 |
| 2010/0314849 A1* | 12/2010 | Realegeno-Amaya | |
| | | | B62B 5/0006 |
| | | | 280/79.11 |
| 2012/0043731 A1* | 2/2012 | Hassell | B62B 3/16 |
| | | | 280/79.2 |
| 2012/0049472 A1* | 3/2012 | Patterson | B62B 3/16 |
| | | | 280/33.998 |
| 2012/0267869 A1* | 10/2012 | Hassell | B62B 3/02 |
| | | | 280/79.11 |

* cited by examiner

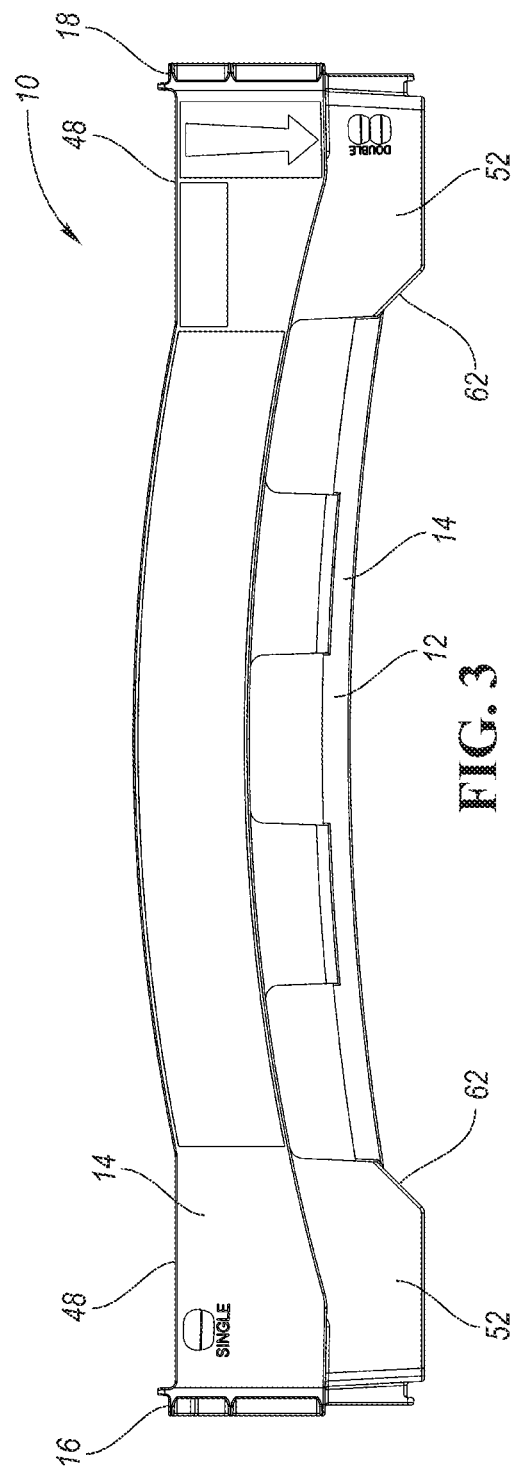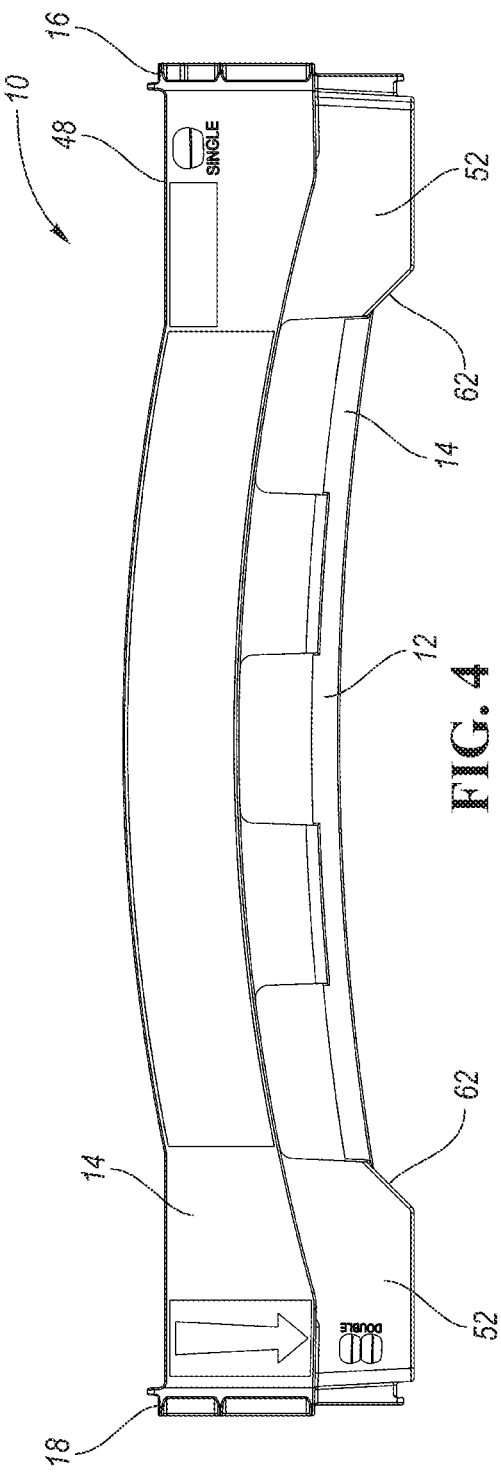

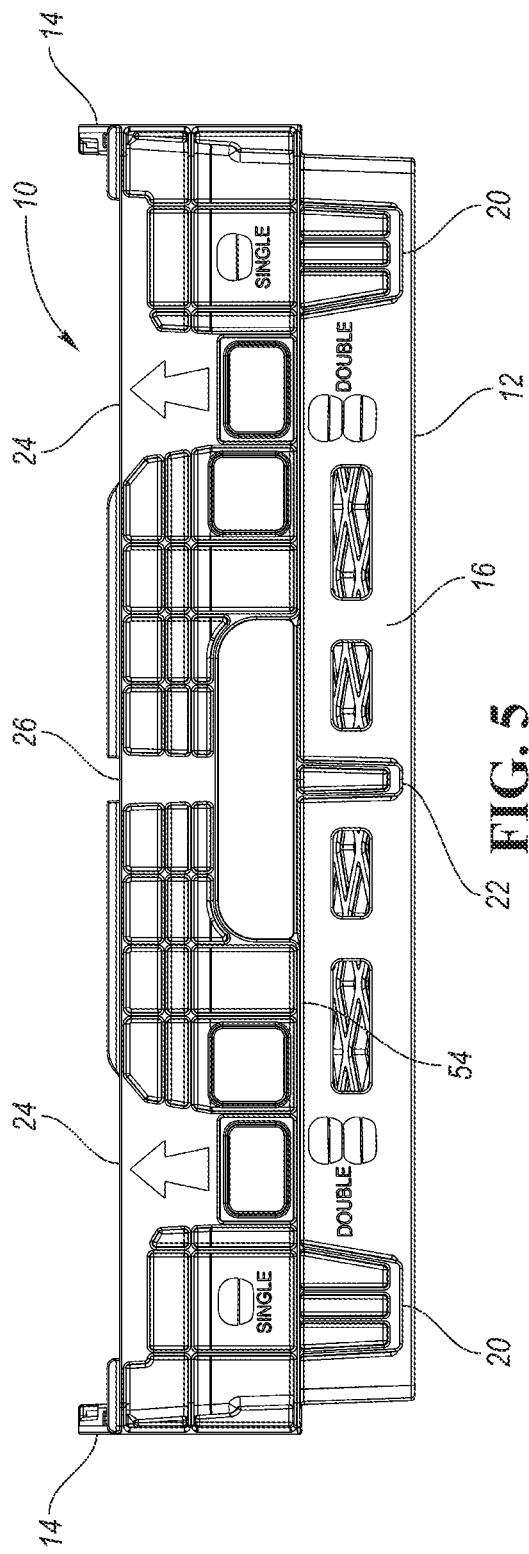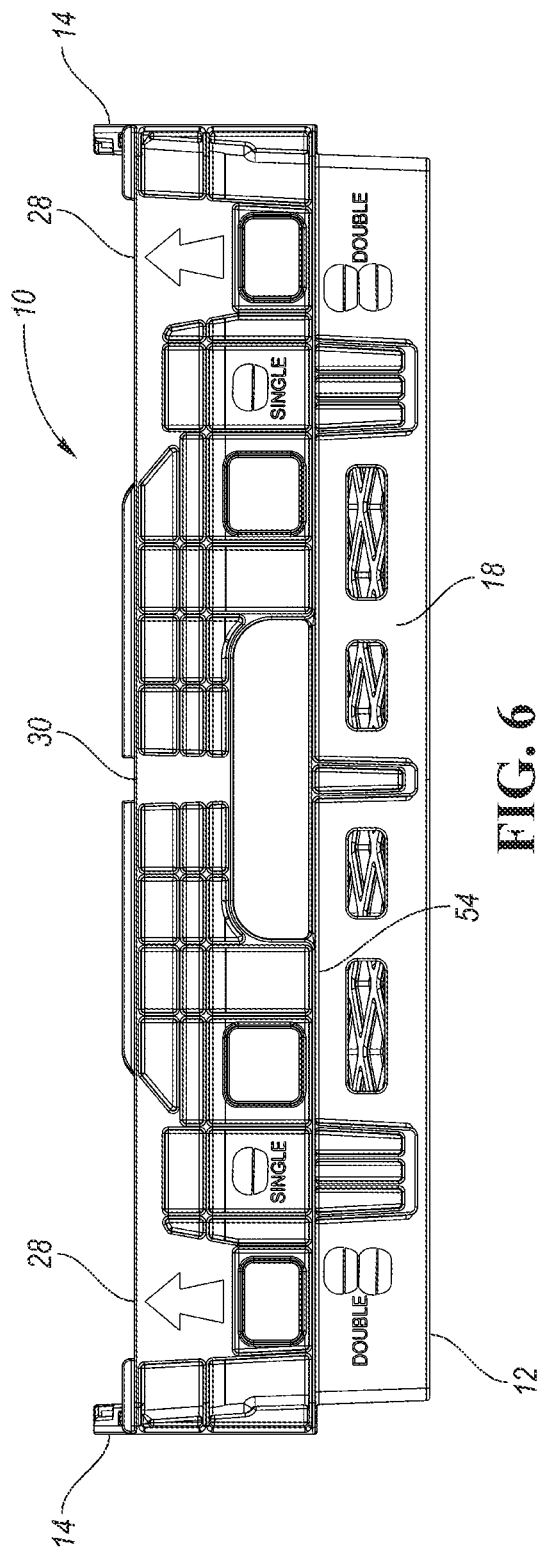

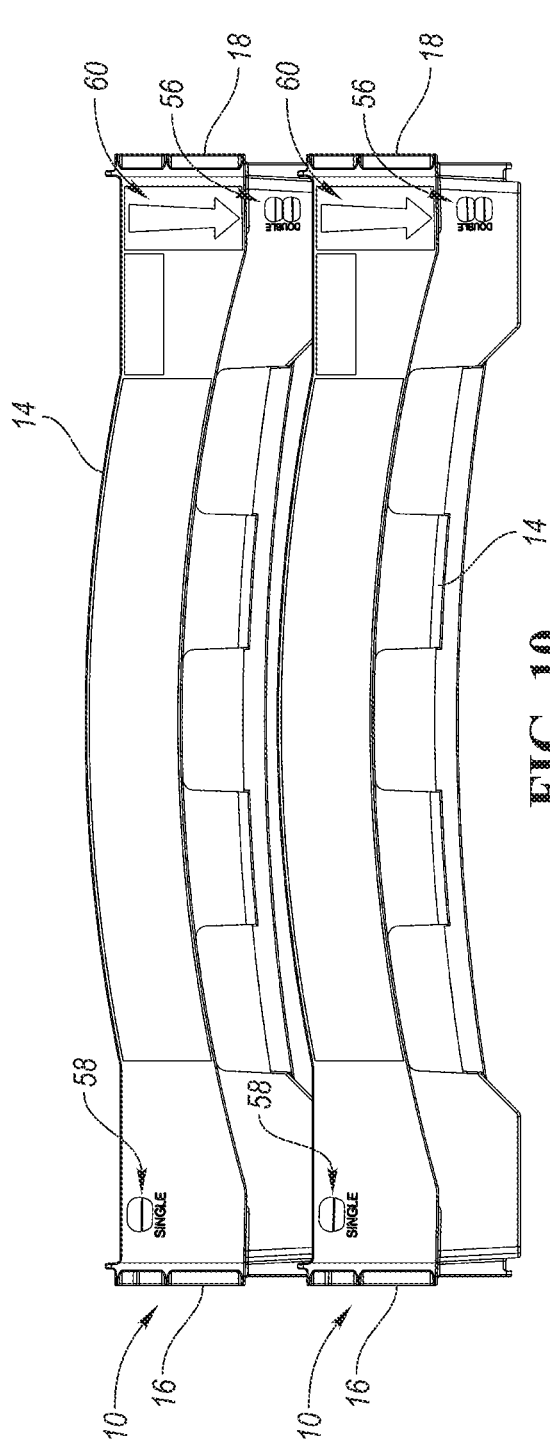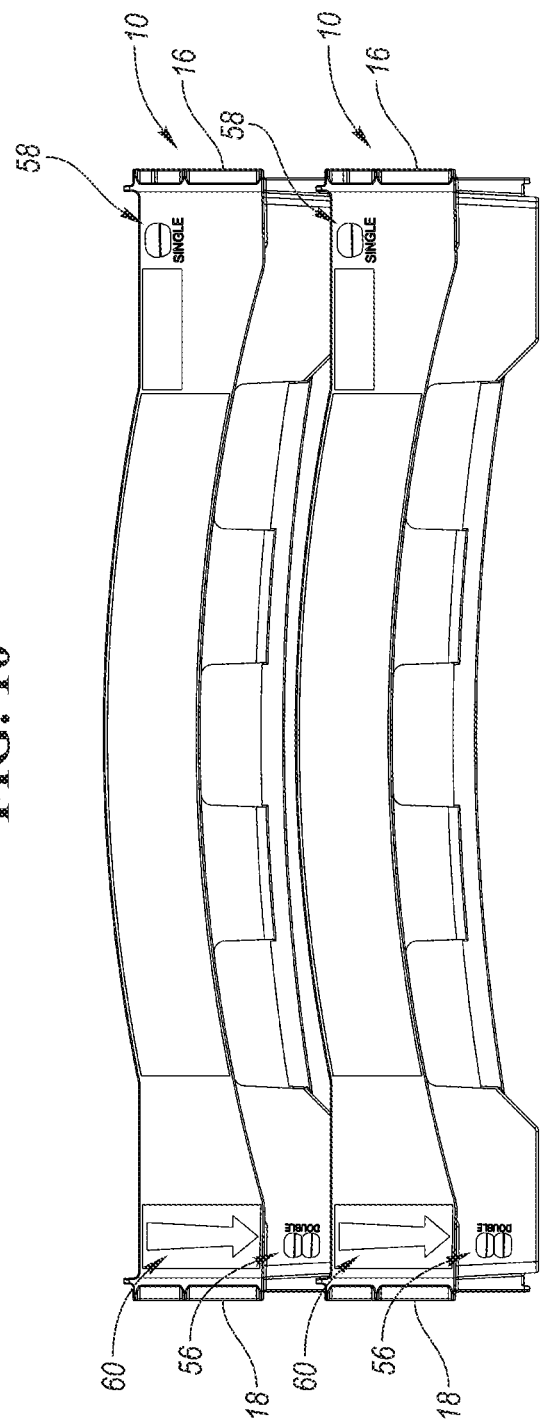

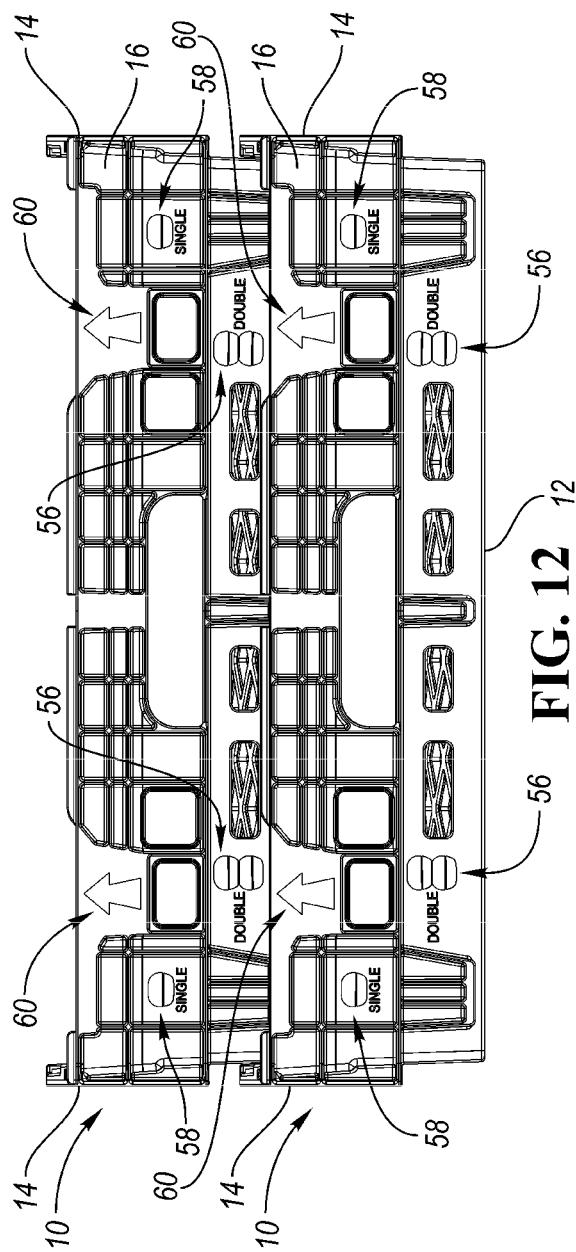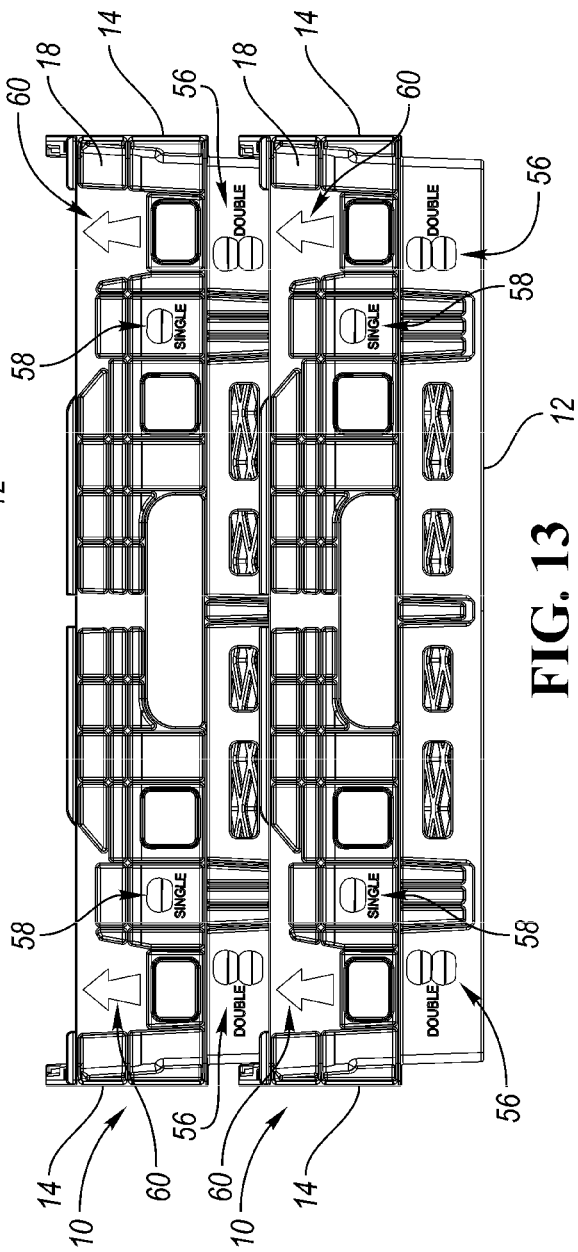

BAKERY TRAY ASSEMBLY

The application claims priority to U.S. Provisional Application No. 62/480,957 which was filed on Apr. 3, 2017.

BACKGROUND

Summary

In one exemplary embodiment, a tray includes a base. A first pair of opposing walls extend upwardly from the base. A second pair of opposing walls extend upwardly from the base. At least one high stack indicia and at least one low stack indicia are located on at least one of the first pair of walls and the second pair of walls.

In another exemplary embodiment, a method of stacking trays includes the step of determining whether to stack an upper tray on a lower tray in a high stack position or in a low stack position. An indicator is aligned on the lower tray with a high stack indicia on the upper tray when stacking the upper tray on the lower tray in the high stack position. The indicator is aligned on the lower tray with a low stack indicia on the upper tray when stacking the upper tray on the lower tray in the low stack position.

In another exemplary embodiment, a dolly includes a deck that has a lower surface, an upper support surface, at least one lower support surface, a first pair of opposing sides, and a second pair of opposing sides. A plurality of casters extend from the lower surface of the deck. At least one of the first pair of sides and the second pair of sides each include a recessed portion for accepting a first pair of casters of a similar dolly stacked thereon.

These and other features of the disclosed examples can be understood from the following description and the accompanying drawings, which can be briefly described as follows.

BRIEF DESCRIPTION OF THE DRAWINGS

FIG. 3 is a front view of the tray of FIG. 1.

FIG. 4 is a back view of the tray of FIG. 1.

FIG. 5 is a side view of the tray of FIG. 1.

FIG. 6 is another side view of the tray of FIG. 1.

FIG. 10 is a front view of the tray of FIG. 1 stacked on another tray of FIG. 1 in the high stacked configuration.

FIG. 11 is a back view of the tray of FIG. 1 stacked on another tray of FIG. 1 in the high stacked configuration.

FIG. 12 is a side view of the tray of FIG. 1 stacked on another tray of FIG. 1 in the high stacked configuration.

FIG. 13 is another side view of the tray of FIG. 1 stacked on another tray of FIG. 1 in the high stacked configuration.

DETAILED DESCRIPTION

Figure 1:
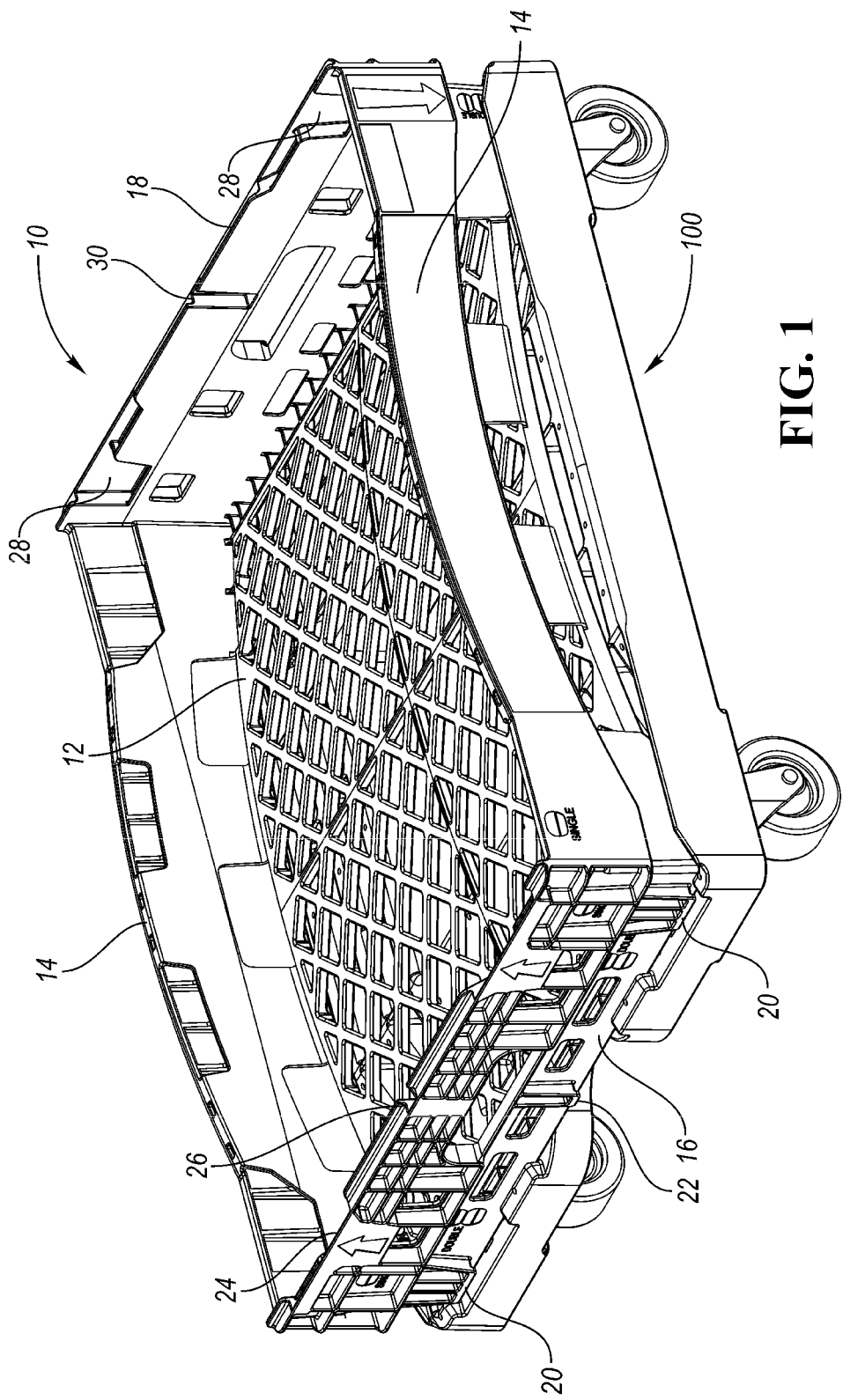
FIG. 1 illustrates a tray according to a non-limiting embodiment stacked on a dolly according to a non-limiting embodiment.

FIG. 1 illustrates a non-limiting embodiment of a bakery tray 10 stacked on a non-limiting embodiment of a dolly 100. The tray 10 generally includes a base 12, front and rear walls 14 extending upwardly from front and rear edges of the base 12 of the tray 10, and side walls 16, 18 extending upwardly from side edges of the base 12 of the tray 10. The side walls 16, 18 include handles formed therein.

Each of the side walls 16, 18 further include a pair of stacking feet 20 and a center projection 22 projecting downwardly. An upper edge of one side wall 16 includes a pair of stacking recesses 24 and a center recess 26 aligned with its corresponding center projection 22. The upper edge of the other side wall 18 includes a pair of stacking recesses 28 and another center recess 30 aligned with its corresponding center projection 22. The stacking feet 20 and the stacking recesses 24, 28 are spaced in such a way as to provide high and low stacking heights when the stacked trays 10 are rotated 180 degrees relative to one another.

For example, on the side wall 16, the stacking feet 20 are spaced further outward (toward front and rear walls 14), while on the side wall 18, the stacking feet 20 (not visible) are spaced further inward (away from front and rear walls 14). The recesses 28 are spaced further outward, while the stacking recesses 24 are further inward. This is one way of providing stacking at a high stack position in one orientation and at a low stack position in another (180 degree) orientation.

Figure 2:
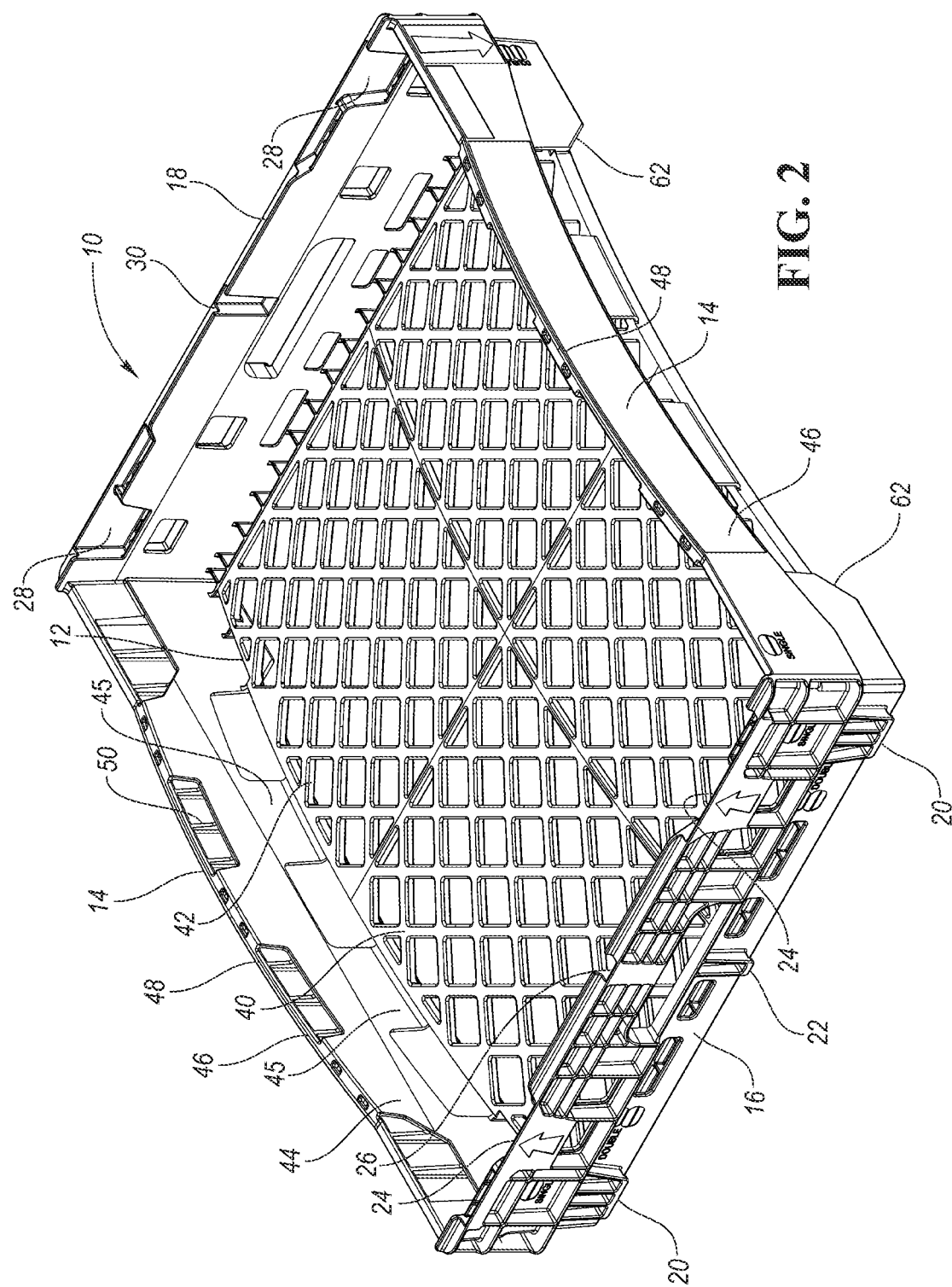
FIG. 2 is a perspective view of the tray of FIG. 1.

FIG. 2 illustrates a perspective view of the tray 10 without the dolly 100. The base 12 includes a curvature that extends between the side walls 16, 18 and peaks in a mid-portion of the tray 10 at a center of the front and rear walls 14. In the illustrated non-limiting embodiment, the base 12 is convex. The base 12 includes an upper surface 40 having ribs 42 extending downward from the support surface 40 to support the base 12 of the tray 10. In another non-limiting embodiment, the curvature of the base 12 could extend between the front and rear walls 14. Additionally, the curvature of the base 12 is continuous between the sidewalls 16, 18. A center portion of the front and rear walls 14 are curved with the base 12, such that each front and rear wall 14 has a peak at a middle portion between the two side walls 16, 18, while outer portions of the front and rear walls 14 have a portion that is parallel to an upper edge of the side walls 16, 18.

Each of the front and rear walls 14 include an inner wall portion 44 and an outer wall portion 46 (or lip). The outer wall portion 46 is spaced outward of the inner wall portion 44 and extends downward from an upper wall portion 48 but not all the way to the bottom of the tray 10. In the illustrated non-limiting embodiment, the outer wall portion 46 extends about halfway from the upper edge of the tray 10 toward the bottom of the tray 10. Ribs 50 connect the inner wall portion 44 to the outer wall portion 46 along the front and rear walls 14. In the illustrated non-limiting embodiment, the ribs 50 do not extent below the outer wall portion 46

The inner wall portion 44 may also include openings exposing the ribs 50 and an inner side of the outer wall portion 46. The openings in the inner wall portion 44 can contribute to a user being able to grab the tray 10 by one of the front or rear walls 14 and be able to grasp the tray 10 better because of the exposed ribs 50. Additionally, the openings exposing the ribs 50 provide clearance for the accepting lower portions 45 of the inner wall portion 44 when the trays 10 are in a high or low stacked position.

FIGS. 3 and 4 illustrate the front and rear walls 14. The front and rear walls 14 include a foot portion 52 that extends inward from the side walls 16, 18 to provide greater support for the tray 10 when the tray is stacked on another flat surface. The upper wall portion 48 also includes a flat segment adjacent each of the side walls 16, 18 that corresponds to the foot portion 52. By having the upper wall portion 48 curved along only a portion of front and rear walls 14, the side walls 16, 18 can have a greater height while still allowing the base to be able to slide along the upper wall portion 48 during sliding/stacking. The greater height of the sidewalls 16, 18 provides greater interior storage height when a similar tray 10 is stacked on the tray 10.

The side walls 16, 18 include a plurality of ribs 54 projecting outward from a planar interior wall portion. The ribs 54 are spaced upward from the lower edge of the side walls 16, 18. The stacking feet 20 and the center projection 22 project downward from the ribs 54 and outward from the lower portions of the side walls 16, 18. The upper ends of the side walls 16, 18 include the stacking recesses 24, 28 for receiving the stacking feet 20 and the center recess for receiving the center projection 22.

Figure 7:
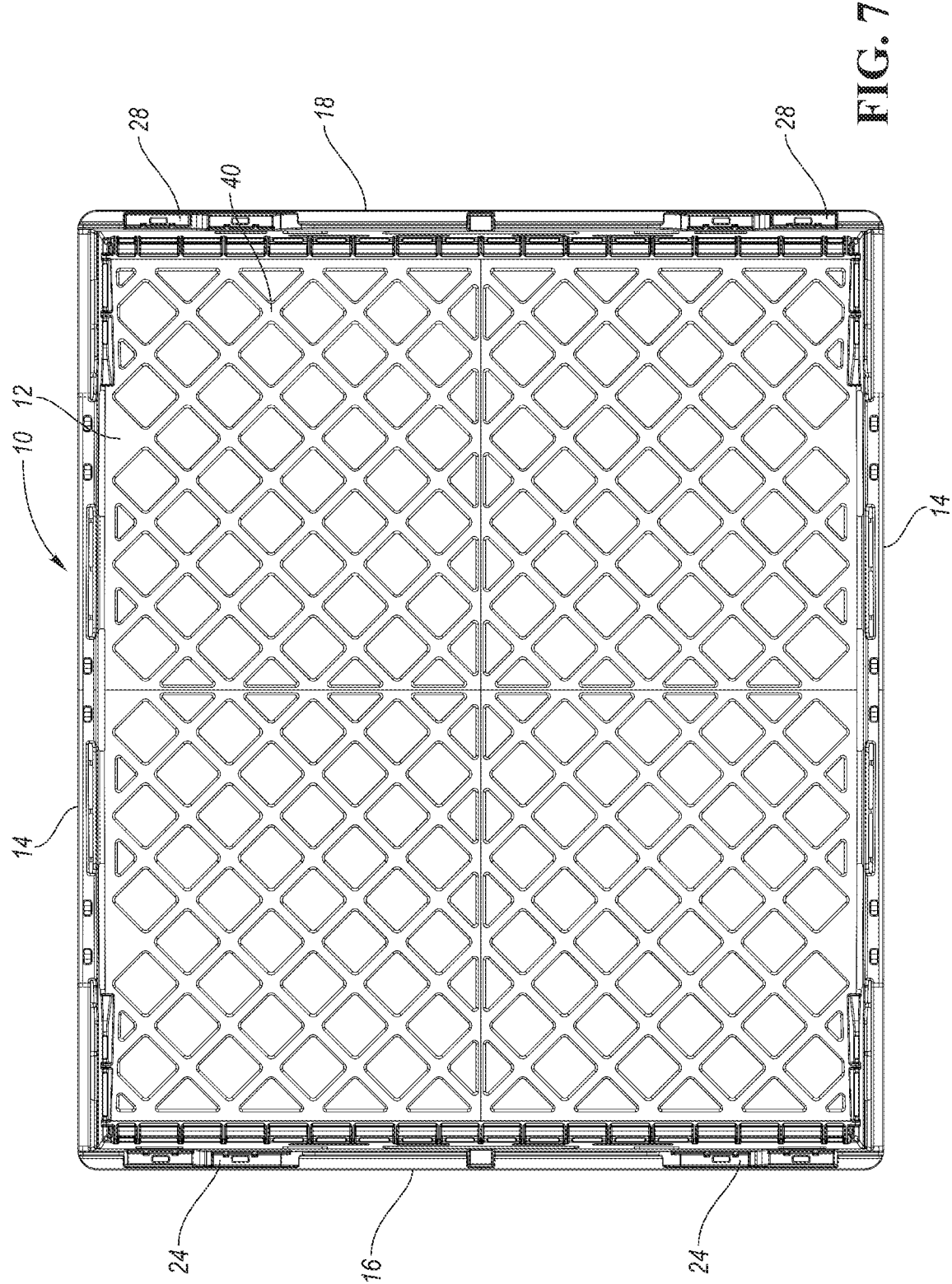
FIG. 7 is a top view of the tray of FIG. 1.
Figure 8:
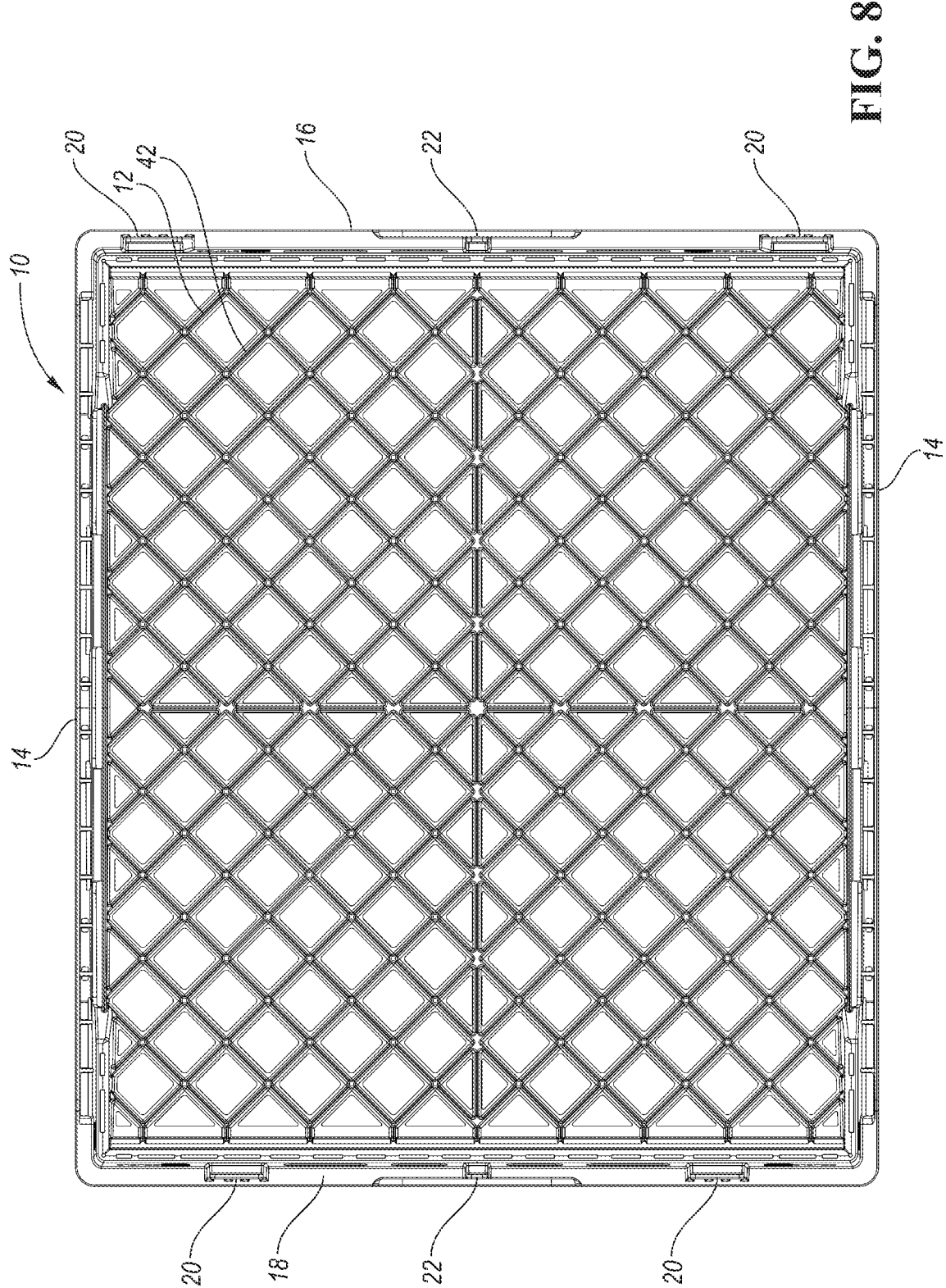
FIG. 8 is a bottom view of the tray of FIG. 1.

FIG. 7 is a top view of the tray 10 showing the support surface 40 and FIG. 8 is a bottom view of the tray 10 illustrating the ribs 42 extending downward from the support surface 40. In the illustrated non-limiting embodiment, the support surface 40 and the ribs 42 form a grid.

Figure 9:
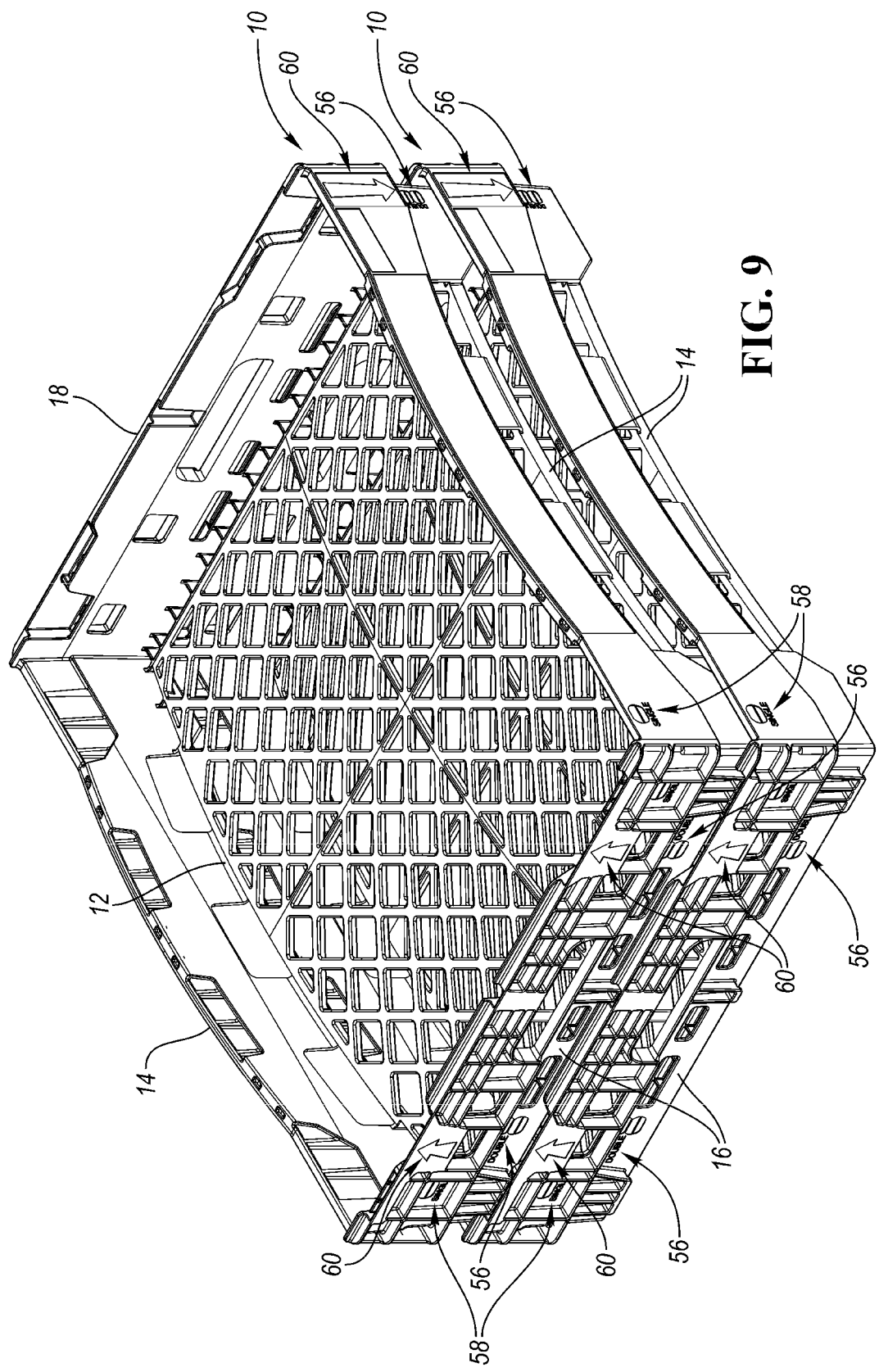
FIG. 9 is a perspective view of the tray of FIG. 1 stacked on another tray of FIG. 1 in a high stacked configuration.

FIG. 9 is a perspective view of the trays 10 in a high stacked position and FIGS. 10-11 show the front and rear walls 14 of the trays 10 in the high stacked position. The trays 10 include high stack indicia 56 and low stack indicia 58. Whether or not the trays 10 are in the high stacked or low stacked position is determined by an indicator 60, such as an arrow, pointing at either the high stack indicia 56 or the low stack indicia 58. As shown in FIGS. 9-11, the indicator 60 on the front and rear walls 14 of the upper tray 10 points toward or identifies the high sack indicia 56 which corresponds to the high stacked position of the trays 10. Although the high and low stack indicia 56, 58 include a symbol and text in the illustrated embodiment, other indicia could be used. Additionally, the high and low stack indicia 56, 58 could be recessed into a surface or printed on a surface of the front and rear walls 14.

FIGS. 12 and 13 illustrate the side walls 16, 18 of the trays 10 in a high stacked position. The side walls 16, 18 also include the high stack indicia 56, the low stack indicia 58, and the indicators 60. The high and low stack indicia 56, 58 on the side walls 16, 18 work in a similar fashion as the high and low stack indicia 56, 58 on the front and rear walls 14. As shown in FIGS. 12 and 13, the indicators 60 on the side walls 16, 18 of the lower tray 10 point towards or identifies the high stack indicia 56 which corresponds to the high stacked position of the trays 10. Also, the high stacked position of FIGS. 9-13 corresponds to the side walls 16, 18 being stacked on the same side wall 16, 18.

Furthermore, the low stack indicia 58 are spaced a first distance from an adjacent one of the front and rear walls 14 and the indicators 60 are spaced a second distance from the adjacent one of the front and rear walls 14 that is different from the first distance such that the low stack indicia 58 and the indicators 60 are not in an overlapping relationship relative to the adjacent one of the front and rear walls 14. The low stack indicia 58 are also located between the indicators 60 and the base 12.

The high stack indicia 56 and the indicators 60 are spaced a similar distance from an adjacent one of the front and rear walls 14 such that the high stack indicia 56 and the indicators 60 are in an overlapping relationship relative to the adjacent one of the front and rear walls 14. The high stack indicia 56 are also located between the indicators 60 and the base 12.

Figure 14:
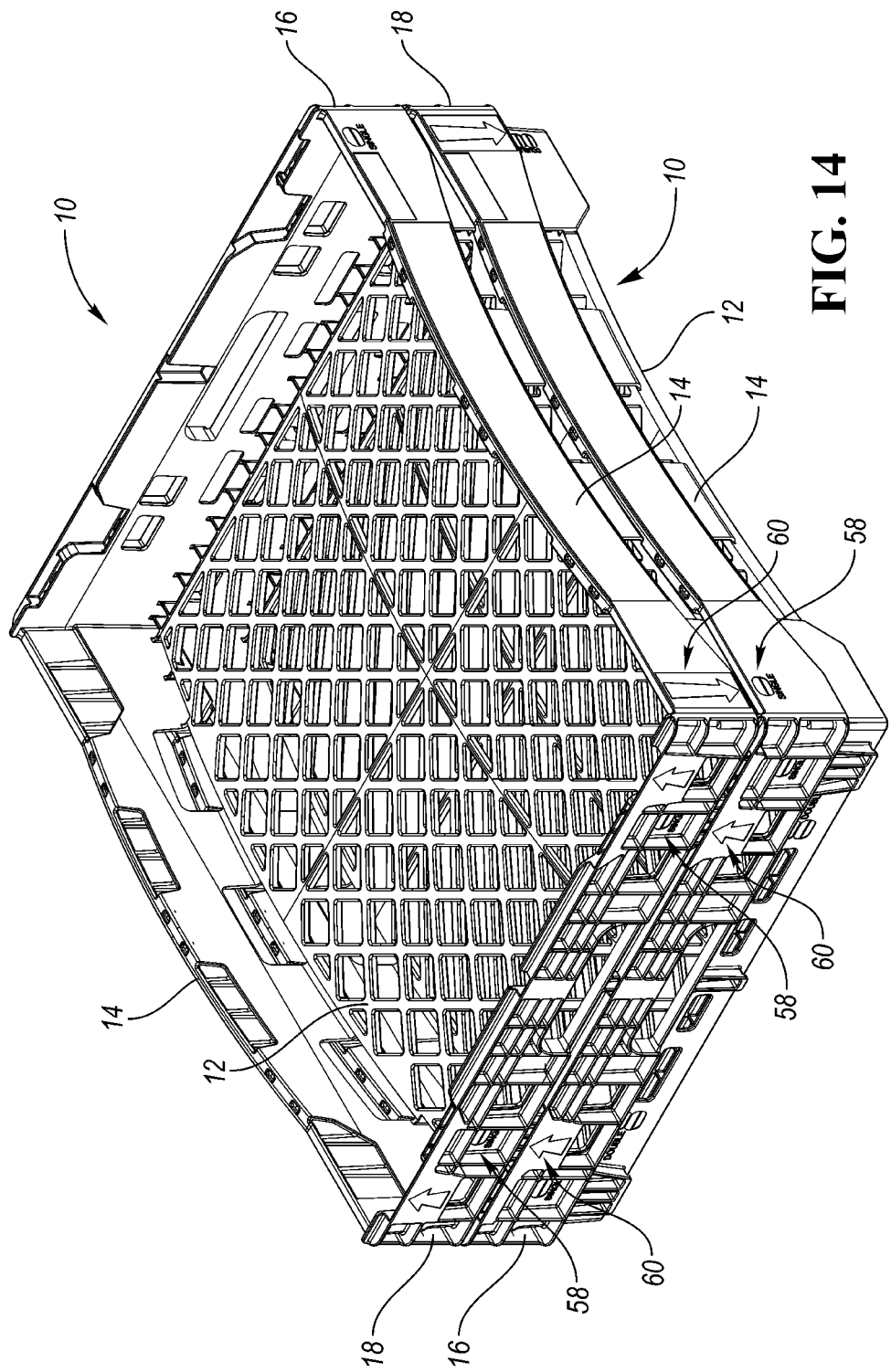
FIG. 14 is a perspective view of the tray of FIG. 1 stacked on another tray of FIG. 1 in a low stacked configuration.
Figure 15:
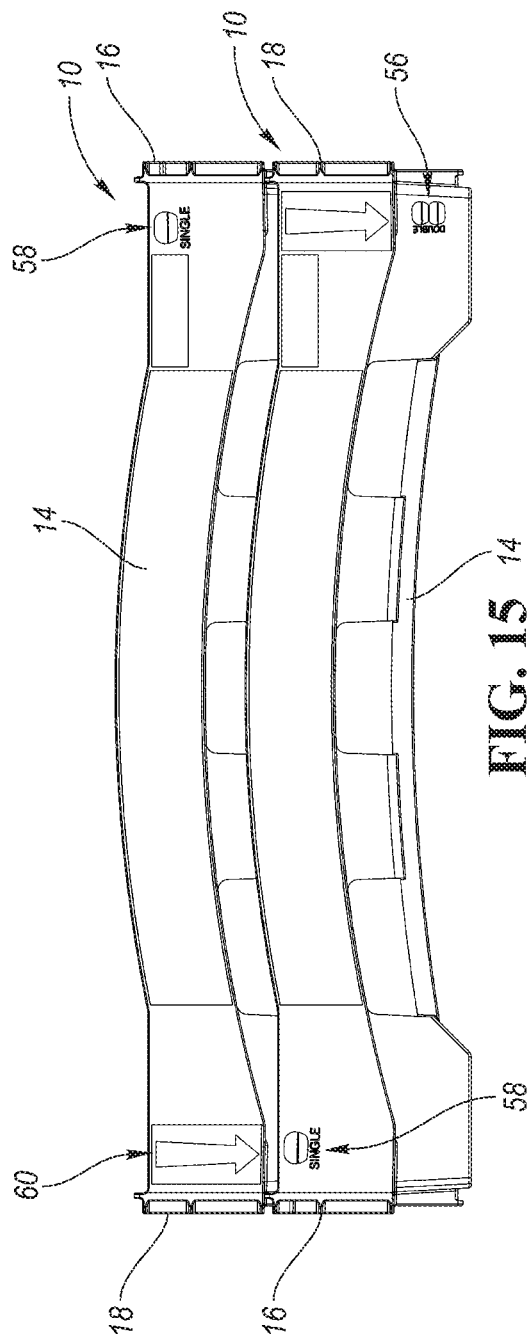
FIG. 15 is a front view of the tray of FIG. 1 stacked on another tray of FIG. 1 in the low stacked configuration.
Figure 16:
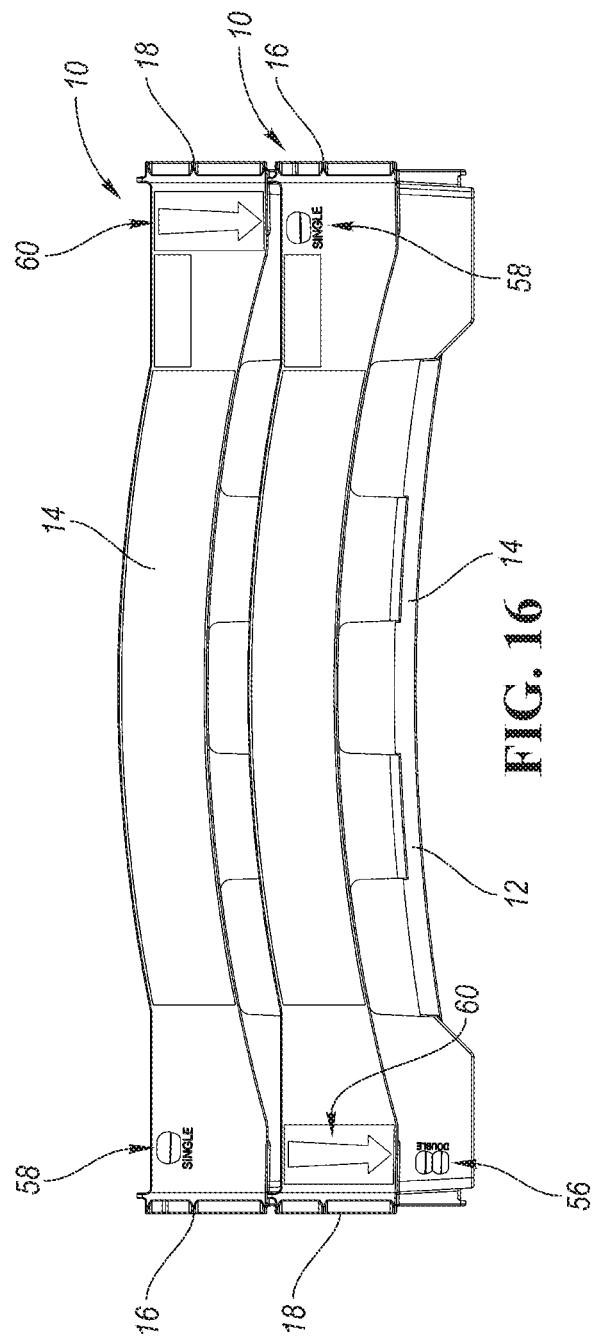
FIG. 16 is a back view of the tray of FIG. 1 stacked on another tray of FIG. 1 in the low stacked configuration.

FIG. 14 is a perspective view of the trays 10 in a low stacked position and FIGS. 15-16 illustrate the front and rear walls 14 in the low stacked position. When the trays 10 are in the low stacked position, the indicators 60 point towards or identify the low stack indicia 58. The trays 10 are in the lowest stacked position when indicators 60 on the front and rear walls of the upper tray 10 are aligned with the low stack indicia 58 on the lower tray 10.

Furthermore, the low stack indicia 58 and the indicators 60 on the front and rear walls 14 are positioned relative to the base 12 in an overlapping relationship. The low stack indicia 58 is skewed adjacent a top edge of the front and rear walls 14 relative to the indicators 60. Also, the low stack indicia 58 are spaced a first distance from the side wall 16 and the indicator 60 is spaced a second distance from the side wall 18 and the first distance is equal to the second distance. In another example, the first distance is approximately equal to the second distance within 20% of the total distance.

Figure 17:
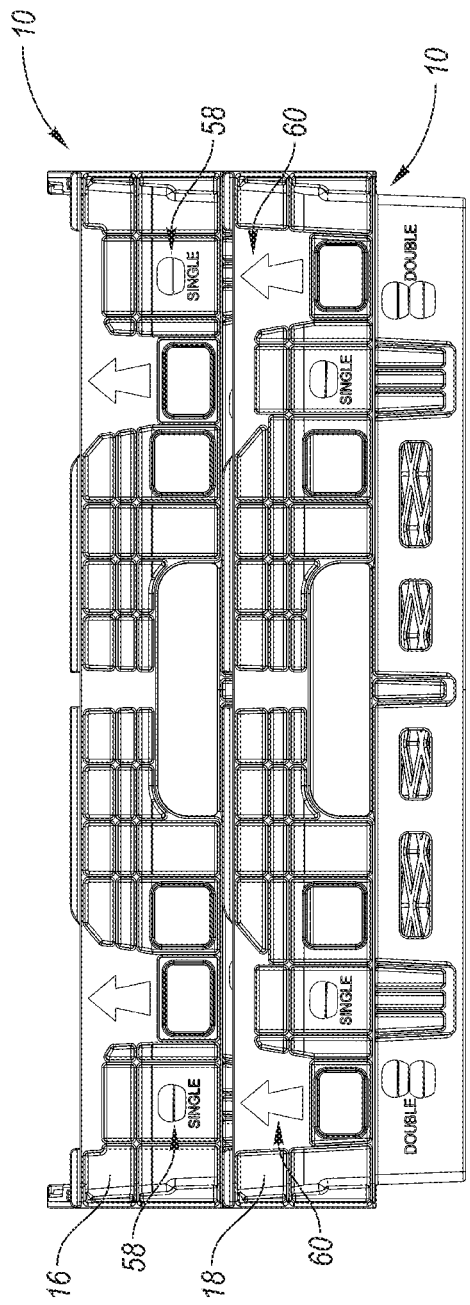
FIG. 17 is a side view of the tray of FIG. 1 stacked on another tray of FIG. 1 in the low stacked configuration.
Figure 18:
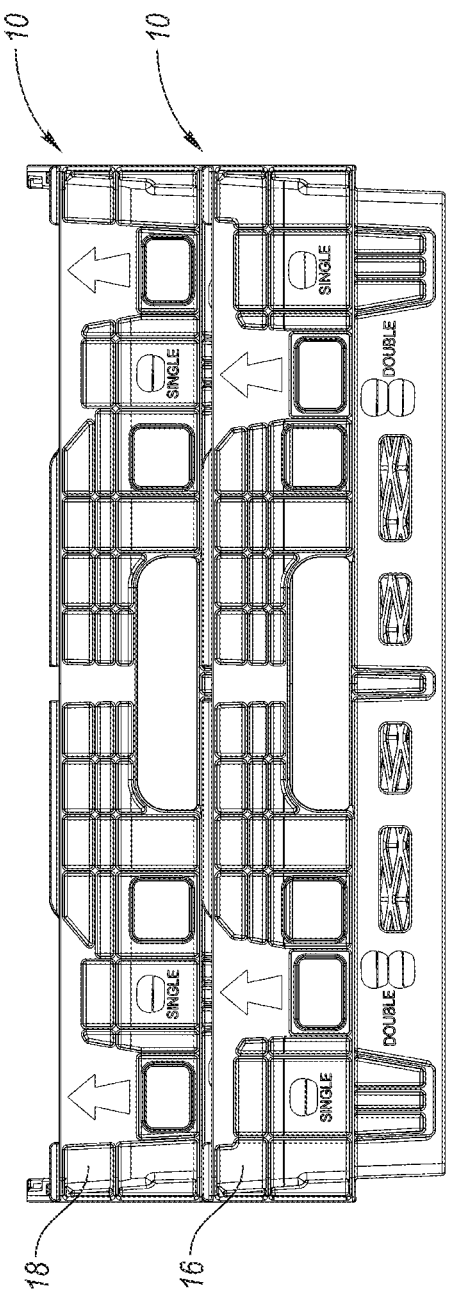
FIG. 18 is another side view of the tray of FIG. 1 stacked on another tray of FIG. 1 in the low stacked configuration.

FIGS. 17 and 18 illustrate views of the side walls 16, 18 when the trays 10 are in the low stacked position. The indicators 60 on the lower tray point towards or are aligned with the low stack indicia 58 on the upper tray 10. Unlike the indicators 60 on the first and rear walls 14, the indicators 60 on the side walls 16, 18 of the lower tray 10 point towards or are aligned with the low stack indicia 58 on the upper tray 10. Also, the low stacked position of FIGS. 14-18 corresponds to the side walls 16, 18 being stacked on an opposite one of the side wall 16, 18.

In any of the stacked positions, because the base 12 of the upper tray 10 has the same contour as the base 12 of the lower tray 10, the vertical height permitted for the product in the tray 10 is maintained. The curvature of the base 12 increases the area of the base 12 so that more product can be accommodated without increasing the outer footprint of the tray 10.

The curved base 12 is designed to increase the footprint of the tray's 10 internal dimensions without increasing the external footprint. This allows the user to fit product in each tray 10 with adequate clearance while maximizing area packout efficiency. The profile of the base 12 could alternatively consist of a single or any combination of curves, angles, steps, etc. geometry as necessary to suit the product going into the tray 10. While the profiling is intended to increase the internal footprint surface area, using like-profiled trays 10 in a stacked configuration maintains internal product height clearance.

In addition to the internal footprint, the profiled base 12 may also provide a structural benefit to the tray 10. The structural benefit would provide decreased tray flexure and/or bowing which may cause product damage, internal fitment issues, or external fitment issues.

Figure 19:
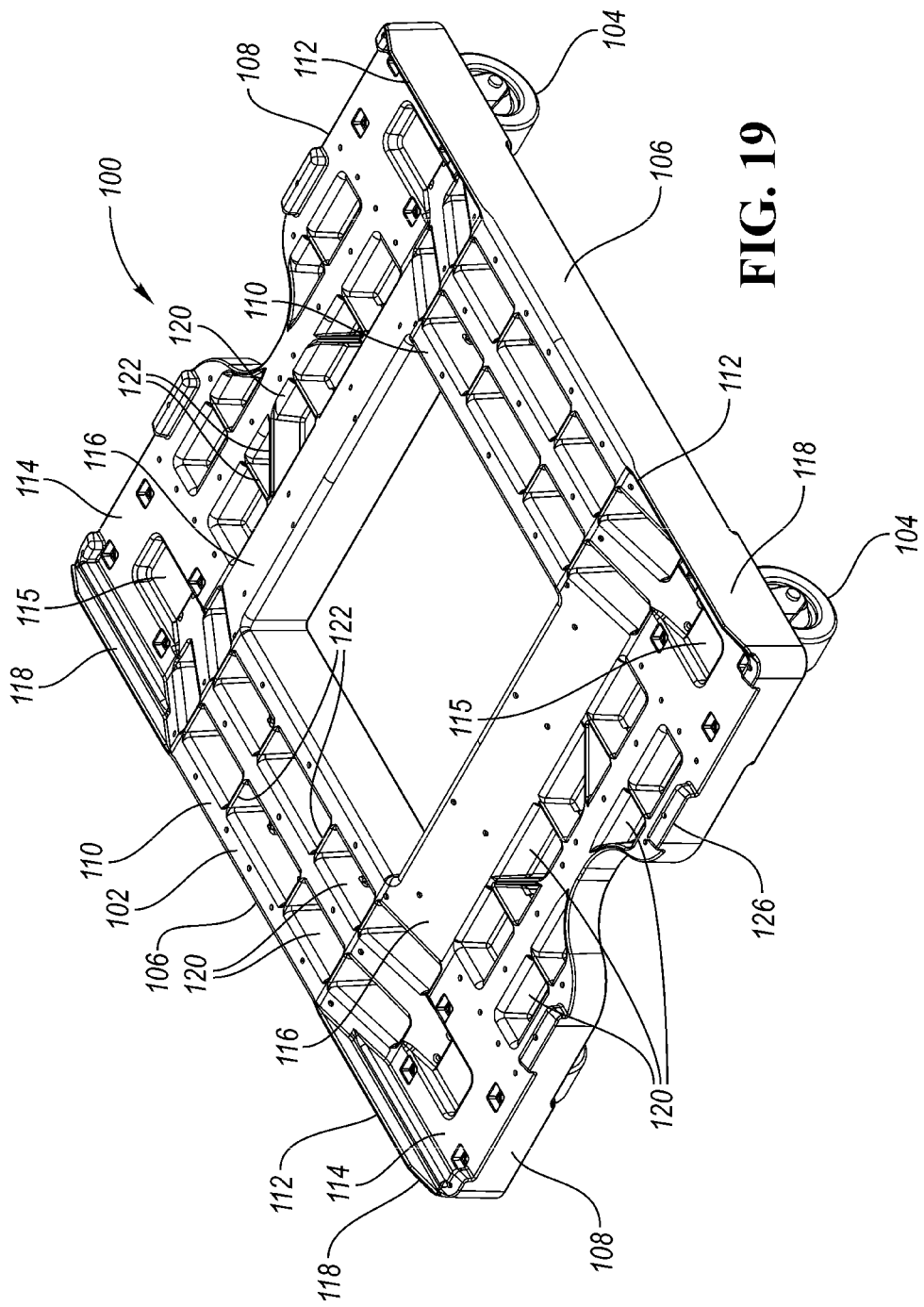
FIG. 19 is a perspective view of the dolly of FIG. 1.

FIG. 19 is a perspective view of the dolly 100 without a tray 10 stacked thereon. The dolly 100 includes a deck 102 having multiple casters 104 extending downward from the deck 102. The deck 102 includes front and rear sides 106 and opposed sides 108. The deck 102 includes an upper surface 110 flush with an upper edge 112 of the front and rear sides 106 and a pair of lower support surfaces 114. The lower support surfaces 114 of the dolly 100 also includes caster recesses 115 for receiving the casters 104 of a similar dolly 100 stacked thereon.

The upper surface 110 is connected to the lower support surfaces 114 through a transition surface 116 located on opposite sides of the upper surface 110 adjacent each of the lower support surfaces 114. An angle of the transition surfaces 116 corresponds to an angled surface 62 on the first and rear walls 14 (FIGS. 3-4) such that the transition surface 116 is transverse to both the upper surface 110 and the lower support surface 114. The angled surface 62 on the tray 10 works in connection with the transition surfaces 116 to center the tray 10 when stacked onto the dolly 100.

The front and rear sides 106 of the dolly 100 includes walls 118 adjacent the opposed sides 108. The walls 118 are formed by the lower height of the lower support surfaces 114 relative to the upper surface 110 and the upper edge 112 remaining generally constant between the opposing sides 108. The walls 118 are spaced from each other by a distance greater than a distance between the front and rear walls 14 of the tray 10 to allow the tray 10 to fit between the walls 118 on opposing front and rear sides 106 of the dolly 100. The walls 118 also prevent the tray 10 from sliding off of the front and rear sides 106 of the dolly 100.

The deck 102 includes multiple troughs 120 that extend through the upper surface 110, the transition surface 116, and the lower support surface 114. The troughs 120 are divided into segments by ribs 122 extending in a direction transverse to a length of the trough 120. The troughs 120 in connection with the ribs 122 contribute to the rigidity of the deck 102.

Figure 20:
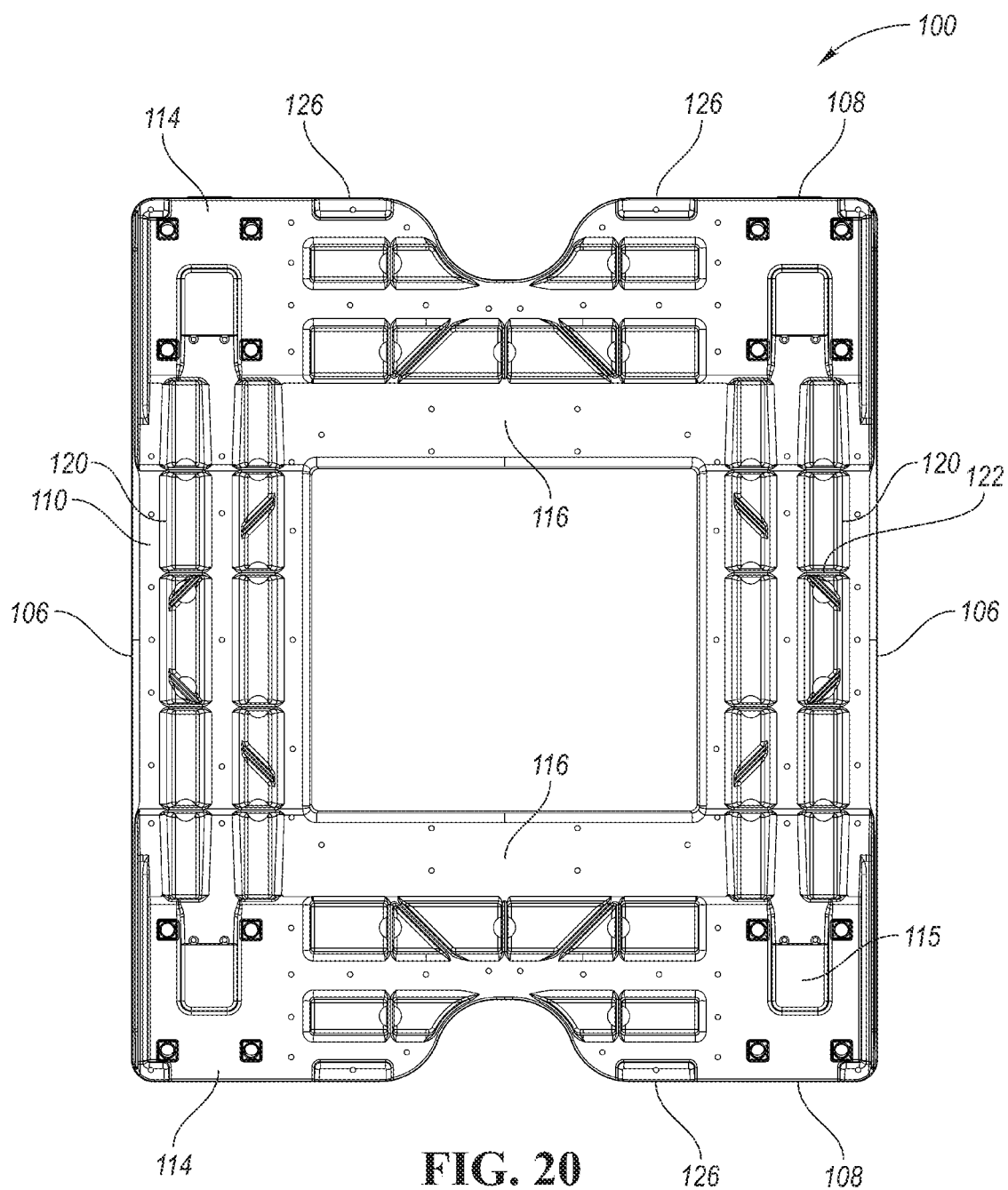
FIG. 20 is a top view of the dolly of FIG. 1.
Figure 21:
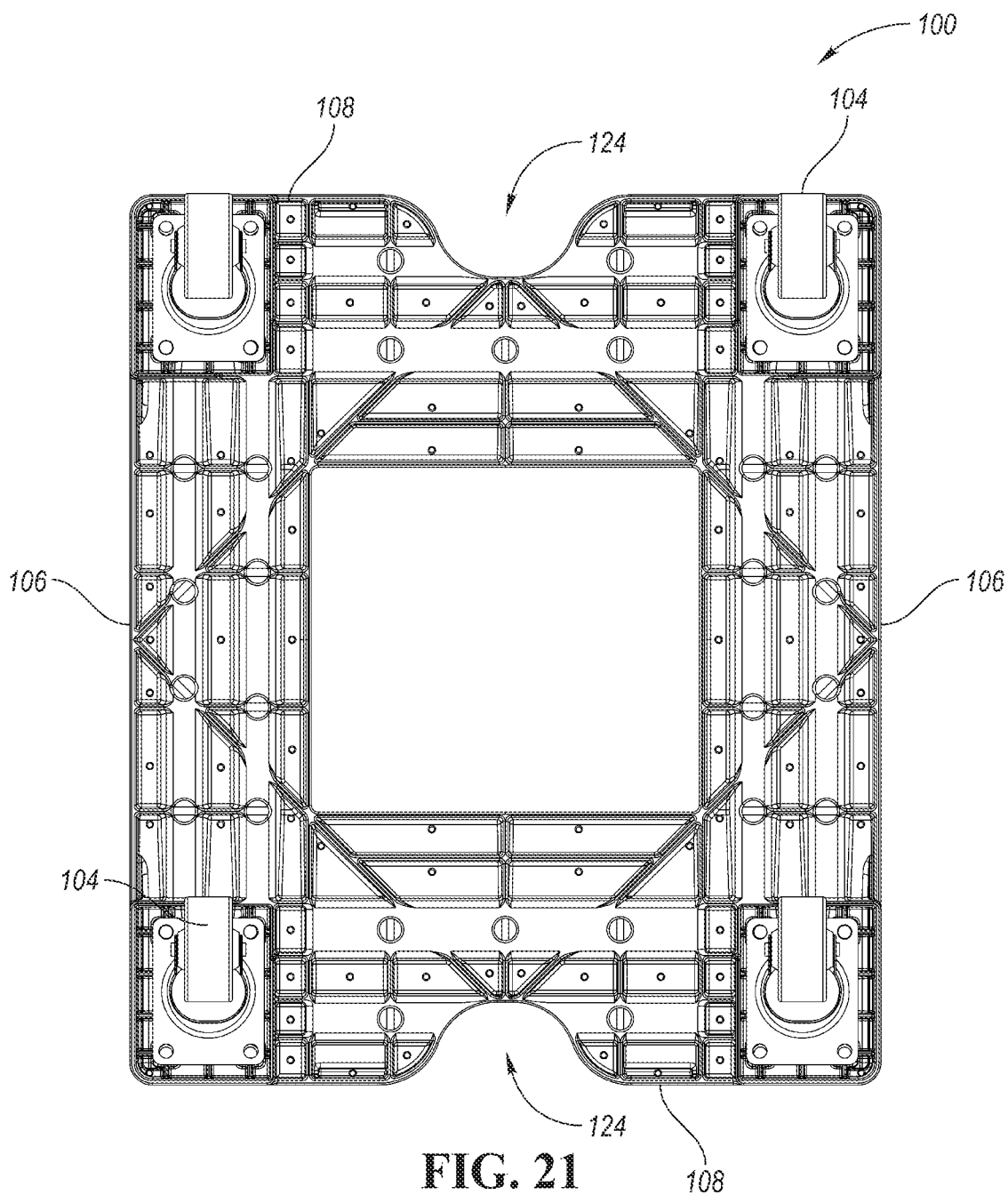
FIG. 21 is a bottom view of the dolly of FIG. 1.

FIG. 20 is a top view of the dolly 100 and FIG. 21 is a bottom view of dolly 100. A subset of the ribs 122 form a square or diamond shape with each other as shown in FIGS. 20-21. The opposed sides 108 include a recessed portion 124 that extends inward into the lower support surface 114. The recessed portion 124 follows a U-shape through the entirety of the deck 102. The recessed portions 124 contribute to the dolly 100 be able to be cross stacked with another similar dolly as will be discussed further below.

Figure 22:
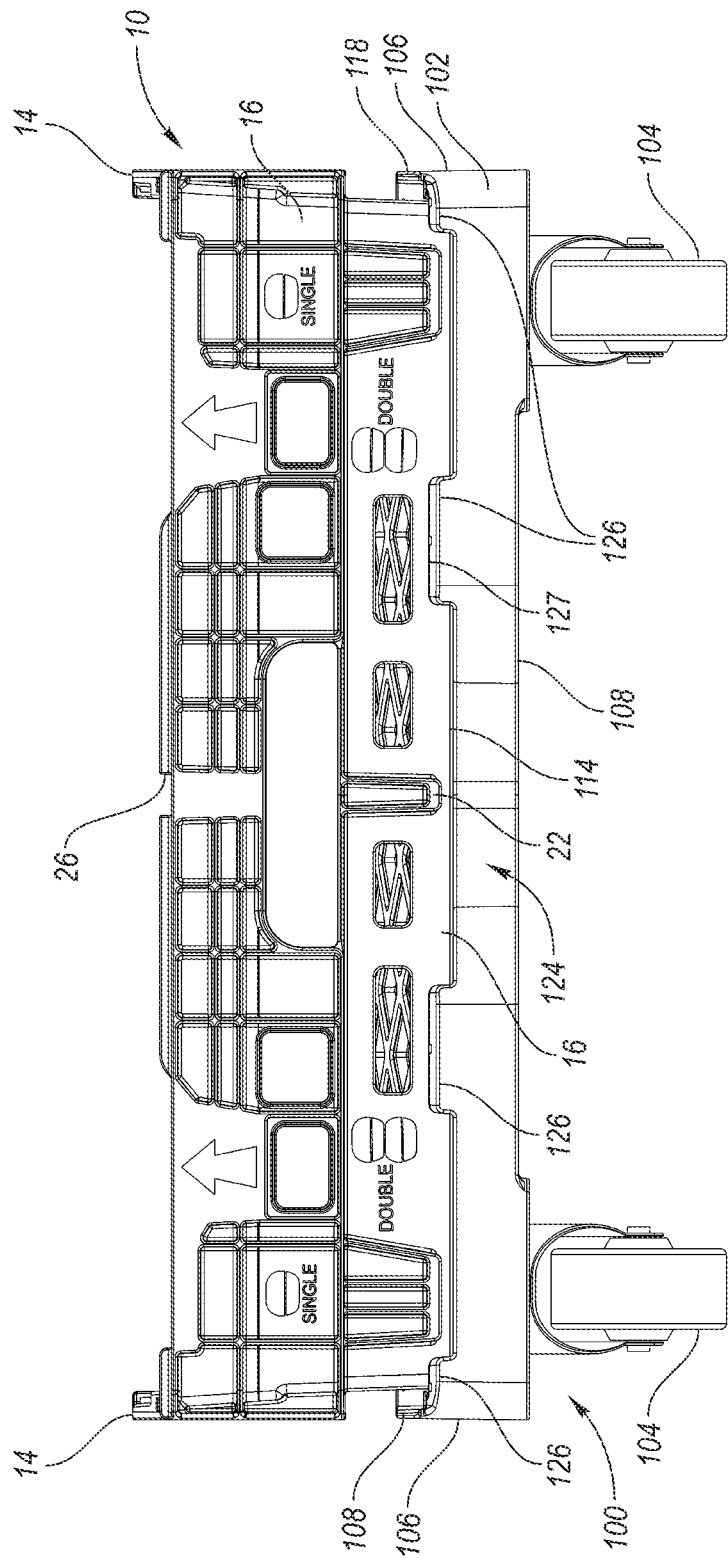
FIG. 22 is a side view foo the tray of FIG. 1 stacked on the dolly of FIG. 1.

FIG. 22 illustrates a side view of the tray 10 stacked on the dolly 100. The deck 102 includes retention tabs 126 on opposite sides of the recessed portion 124 and adjacent the front and rear sides 106. The retention tabs 126 extend upward from the lower support surface 114. The tabs 126 further prevent a tray 10 stacked thereon from moving relative to the dolly 100 by engaging lower portions of the sidewalls 16, 18 on the tray 10. The retention tabs 126 also include a sloped outer face 127 to assist an operator in placing the tray 10 onto the dolly 100 or removing the tray 10 from the dolly 100 by either manually sliding the tray 10 or using a hand truck.

Figure 23:
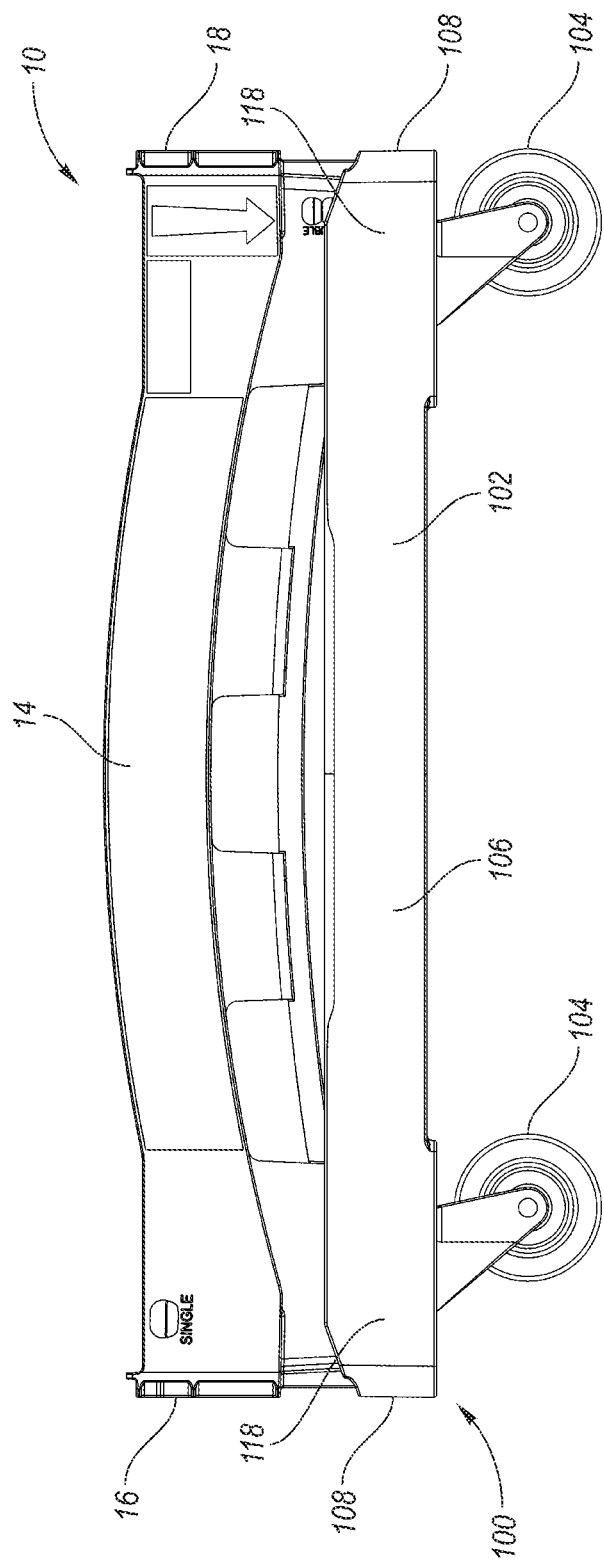
FIG. 23 is a front view foo the tray of FIG. 1 stacked on the dolly of FIG. 1.
Figure 24:
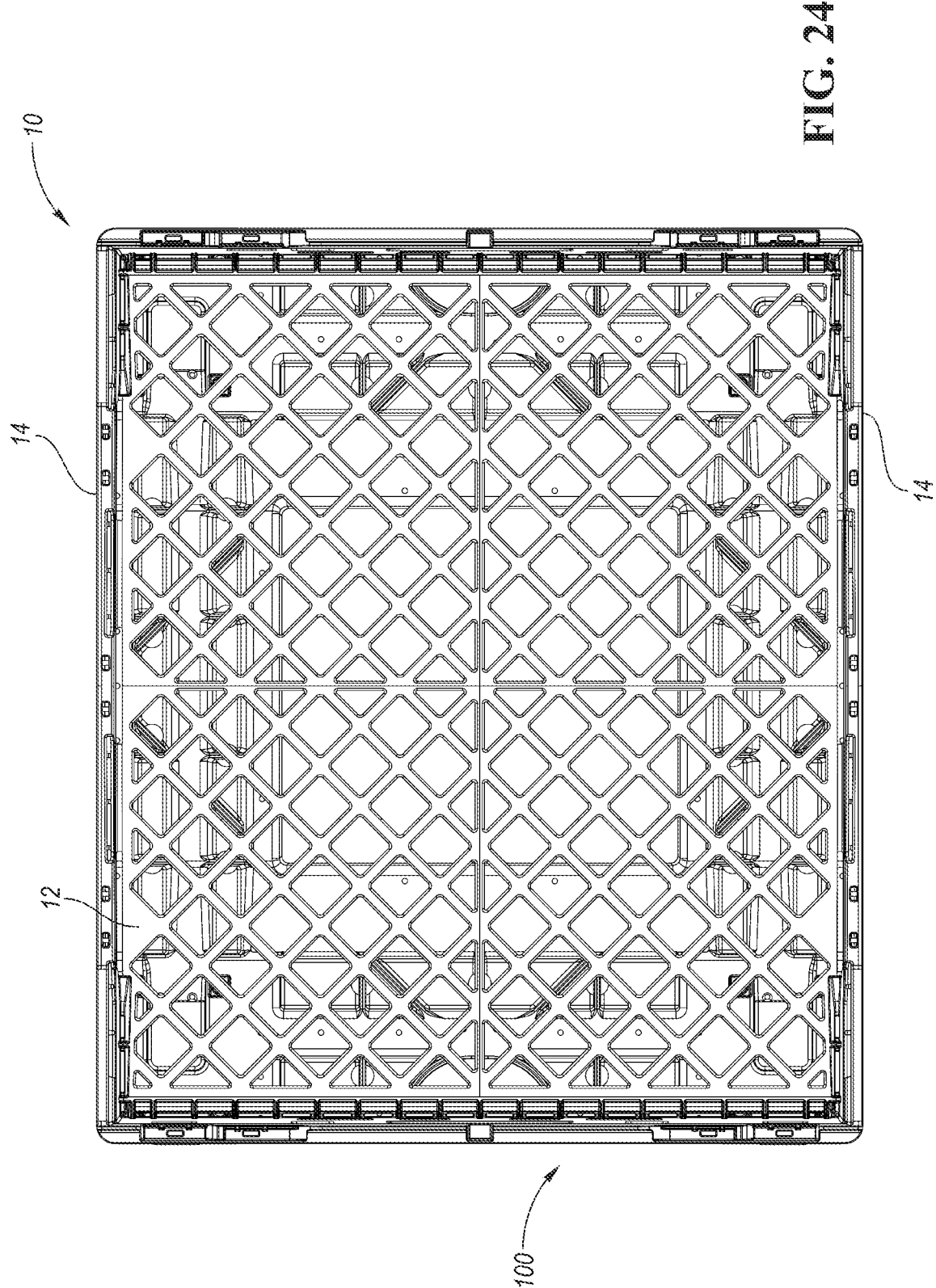
FIG. 24 is a top view foo the tray of FIG. 1 stacked on the dolly of FIG. 1.

FIG. 23 illustrates a front view of the tray 10 stacked on the dolly 100. The front and rear walls 14 of the tray 10 fit between the front and rear sides 106 the dolly 100. The walls 118 partially overlap the foot portions 52 on the front and rear walls 14 of the tray 10 to secure the tray 10 to the dolly 100. FIG. 24 is a top view of the tray 10 stacked on the dolly 100.

Figure 25:
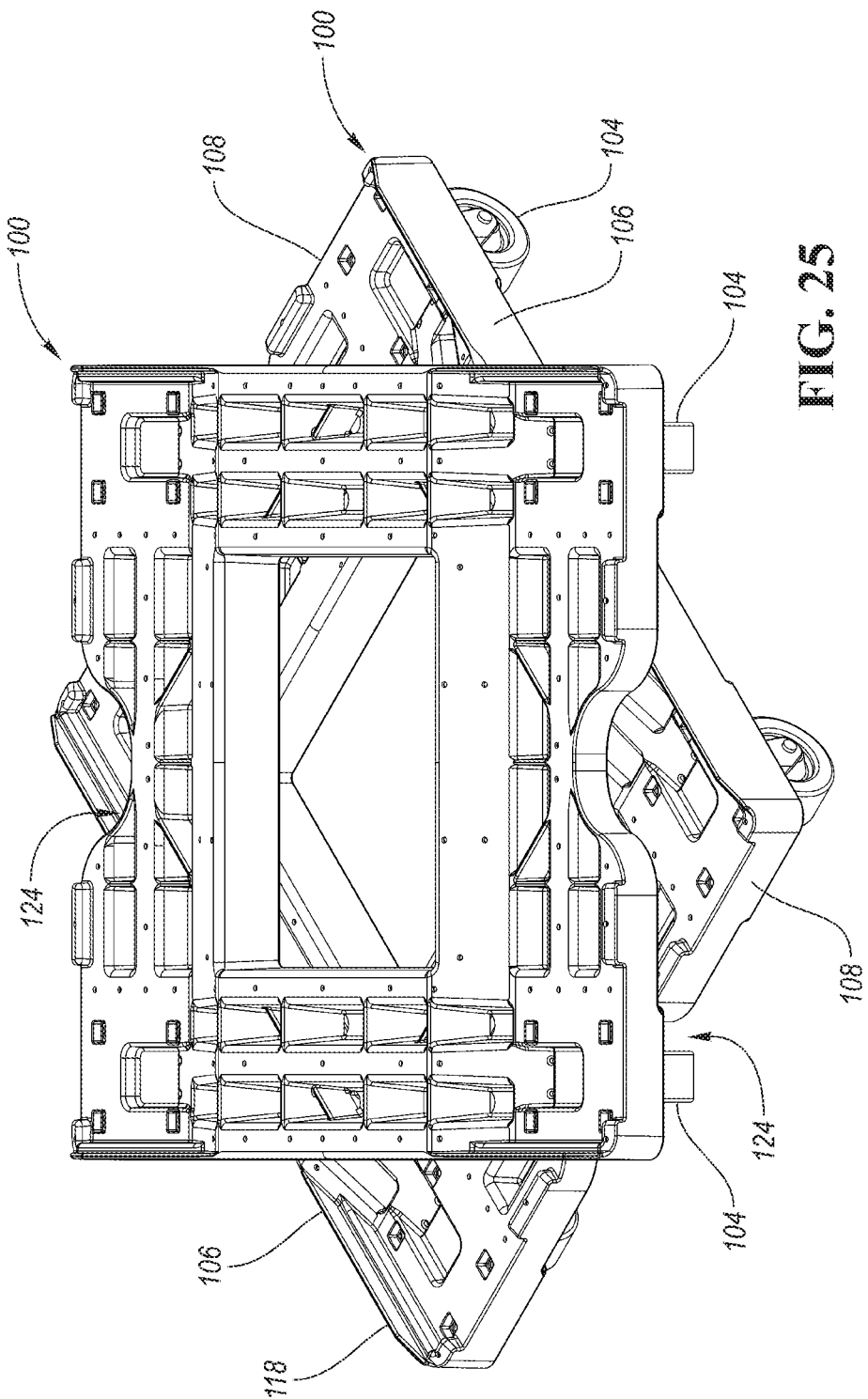
FIG. 25 is a perspective view of the dolly of FIG. 1 stacked on another dolly of FIG. 1.

FIG. 25 illustrates the dolly 100 cross stacked on another dolly 100. In the cross stacked position, the dollies 100 are rotated 45 degrees relative to each other about an axis extending through a center of the deck 102 and perpendicular to the deck 102.

Figure 26:
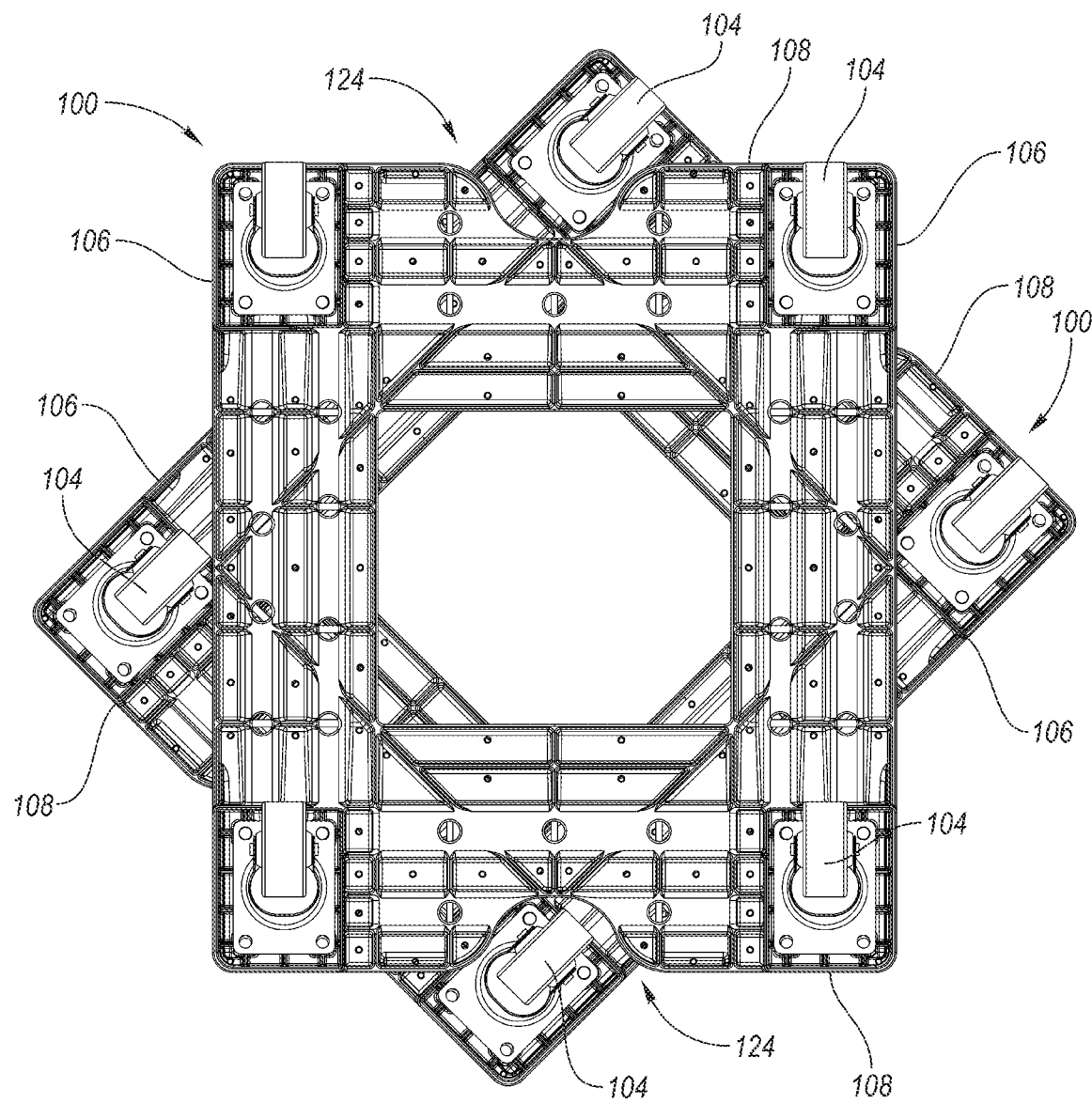
FIG. 26 is a bottom view of the dolly of FIG. 1 stacked on another dolly of FIG. 1.
Figure 27:
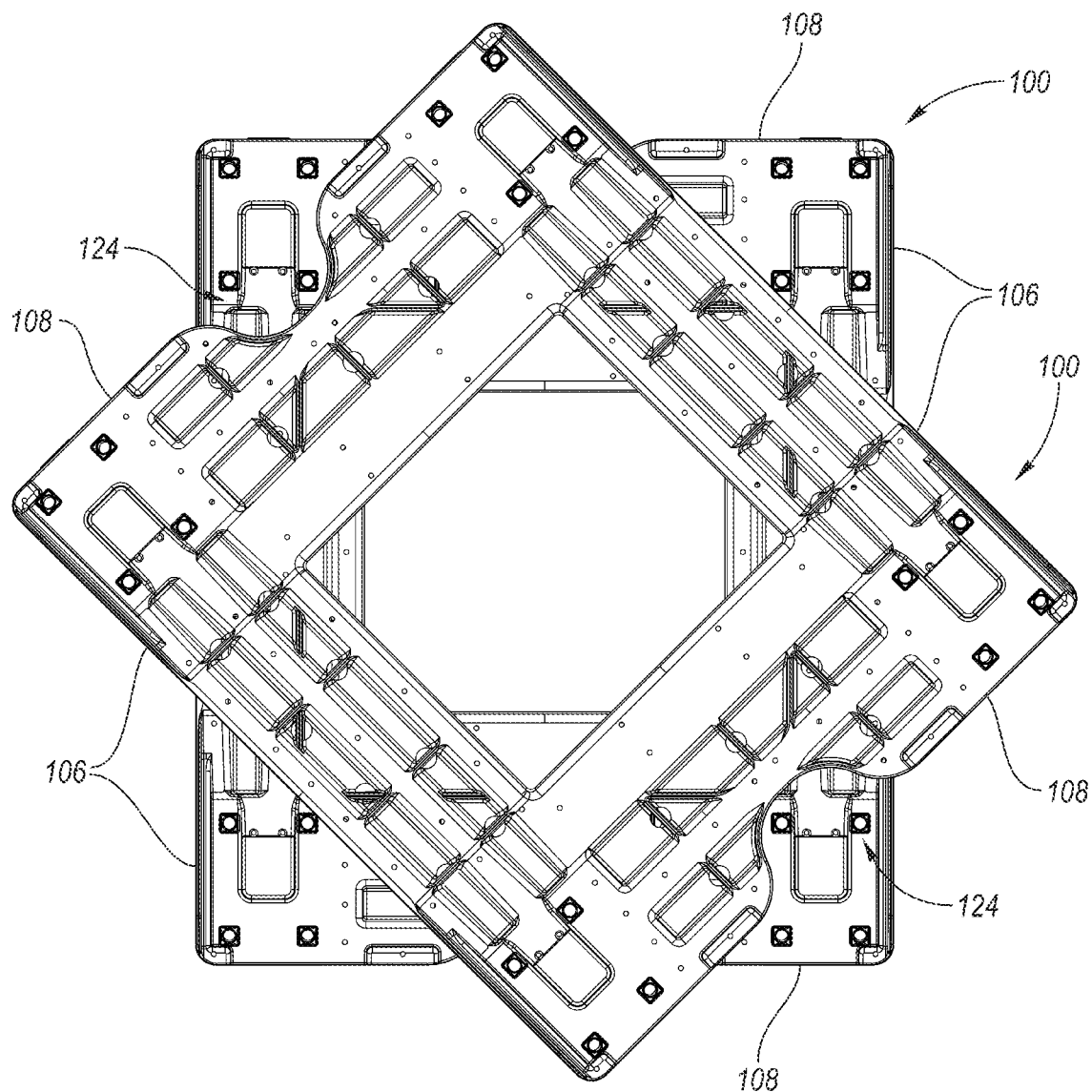
FIG. 27 is a top view of the dolly of FIG. 1 stacked on another dolly of FIG. 1.

FIG. 26 is a bottom view of the dollies 100 stacked on each other. As shown in FIG. 26, two of the casters 104 of the upper dolly 100 are received in the recessed portions 124 to allow the dollies 100 to fit together in closer proximity. In the illustrated embodiment, the recessed portions 124 are large enough to allow the casters 104 on the upper dolly 100 to rotate fully such that the upper dolly 100 can be stacked on the lower dolly 100 with the casters 104 in any orientation. Similarly, the two remaining casters 104 can overhang the front and rear sides 106 a sufficient distance to allow the casters 104 to rotate fully such that the orientation of the casters 104 does not interfere with cross stacking of the dollies 100. This maximizes area packout efficiency for the dollies 100. FIG. 27 is a top view of the dollies 100 stacked on each other.

Figure 28:
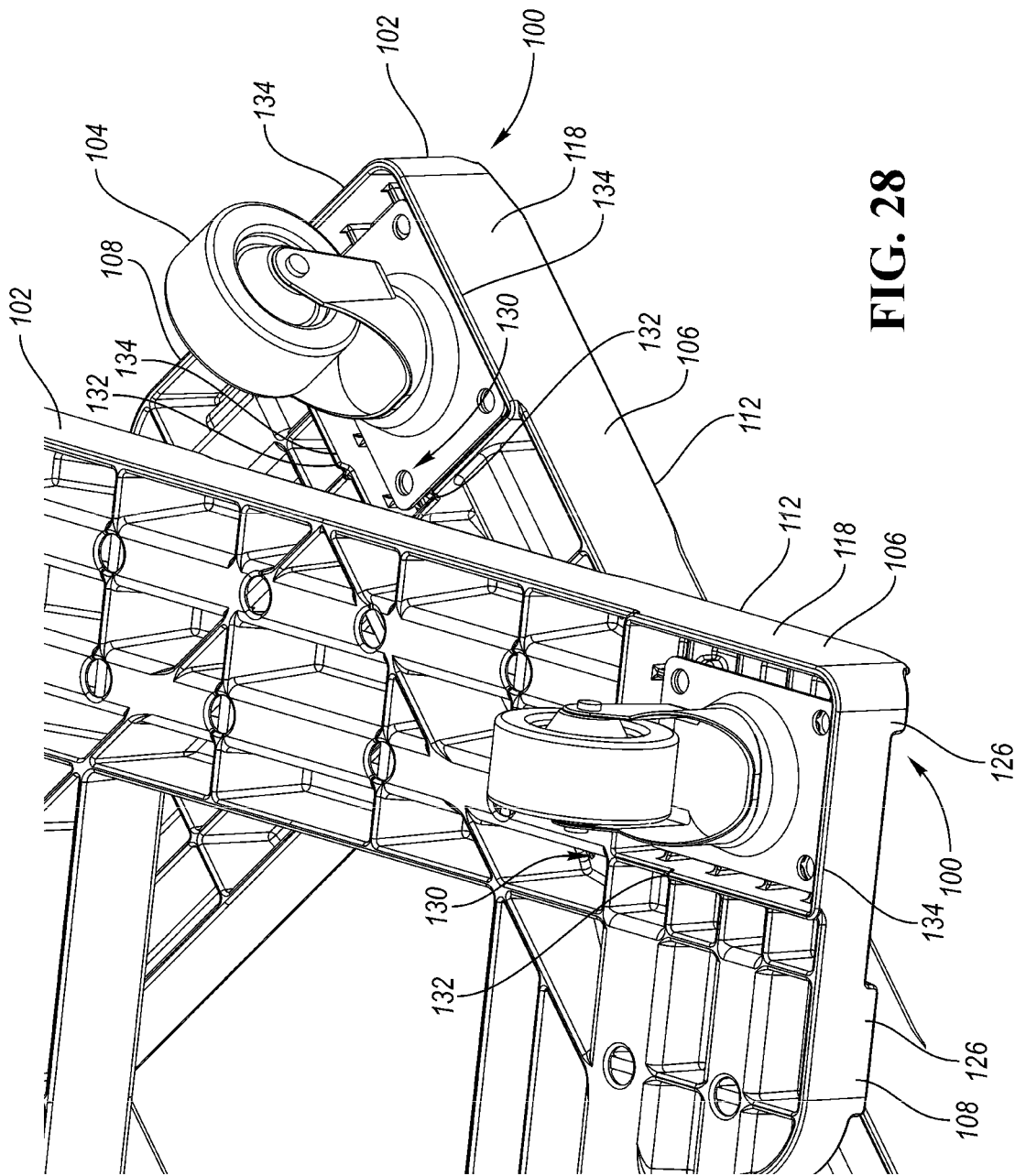
FIG. 28 is an enlarged bottom view of the dolly of FIG. 1 stacked on another dolly of FIG. 1.

FIG. 28 is an enlarged bottom perspective view of a locating feature 130 on the dolly 100. The locating feature 130 assists in aligning the upper dolly 100 when stacked on the lower dolly 100. The locating feature 130 is located on a lower surface of the deck 102. In the illustrated non-limiting embodiment, the locating feature 130 includes a pair of edges 132 at least partially defined by a rib 134 that surrounds the caster 104. The edges 132 engage one of the front and rear walls 106 adjacent the edge 112. Although the rib 134 extends between the edges 132 in the illustrated non-limiting embodiment, multiple rib 134 that only partially surround the caster 104 could be used. For example, the rib 134 could extend from the edge 132 to a corresponding one of the sides 106, 108.

Additionally, the ribs 134 could be located adjacent the casters 104 on the upper tray 10 that are accepted within the recessed portions 124. Although the ribs 134 on the upper tray 10 adjacent the casters 104 located within the recessed portions 124 may not contact the adjacent dolly 100, having the locating ribs 134 on all four corners of the dolly 100 provides outer boundaries for engaging the dolly 100 with fork times. For example, because the locating ribs 134 extend to outer edges of the deck 102, a user trying to engage the dolly 100 with fork times can reference the ribs 134 to know that the fork times should engage the dolly 100 inward of the ribs 134.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A dolly comprising:
   a deck having a lower surface, an upper support surface, a first pair of opposing sides, a second pair of opposing sides, a first lower support surface, a second lower support surface, and a pair of transition surfaces con- nect opposing edges of the upper support surface with a corresponding one of the first and second lower support surfaces;
a first pair of walls extending upward from the first lower support surface along a corresponding one of the second pair of sides and a second pair of walls extending upward from the second lower support surface along a corresponding one of each of the second pair of sides;
a plurality of casters extending from the lower surface of the deck; and
wherein at least one of the first pair of sides and the second pair of sides each include a recessed portion for accepting a first pair of casters of a similar dolly stacked thereon.

2. The dolly of claim 1, wherein an upper edge of each of the first and second pair of walls is aligned with an uppermost surface of the upper support surface and each of the first and second pair of walls are laterally spaced from the upper support surface.

3. The dolly of claim 2, wherein the pair of transition surfaces are spaced from an upper edge of the first and second pair of walls and extend along a corresponding one of the first and second pair of walls.

4. The dolly of claim 1, wherein the pair of transition surfaces are sloped between the upper support surface and a corresponding one of the first and second lower support surfaces and the pair of transition surfaces and the upper support surface at least partially define an opening through the lower surface of the deck.

5. The dolly of claim 1, wherein the first lower support surface includes a first pair of caster recesses and the second lower support surface includes a second pair of caster support recesses and the recessed portion includes a semicircular profile through a corresponding one of the first and second lower support surfaces and the lower surface.

6. The dolly of claim 1, further including a pair of retention tabs separated by a recessed portion.

7. The dolly of claim 6, wherein the pair of retention tabs include a sloped outer surface.

8. A dolly comprising:
a desk having a lower surface, and upper support surface, a first pair of opposing sides, a second pair of opposing sides, a first lower support surface, a second lower support surface, and a pair of transition surfaces connect opposing edges of the upper support surface with a corresponding one of the first and second lower support surfaces, wherein the upper support surface includes a first plurality of troughs divided into segments with a first plurality of ribs and the deck is molded;
a plurality of casters extending from the lower surface of the deck; and
wherein at least one of the first pair of sides and the second pair of sides each include a recessed portion for accepting a first pair of casters of a similar dolly stacked thereon.

9. The dolly of claim 8, wherein the plurality of troughs in the upper support surface extend into the pair of transition surfaces and the first and second lower surfaces include a second plurality of troughs separated into segments by a second plurality of ribs.

10. A dolly comprising:
a deck having a lower surface, an upper support surface, a first pair of opposing sides, a second pair of opposing sides, a first lower support surface, a second lower support surface, and a pair of transition surfaces connect opposing edges of the upper support surface with a corresponding one of the first and second lower support surfaces, wherein the pair of transition surfaces and the upper support surface define a central opening in the dolly;
a plurality of casters extending from the lower surface of the deck; and
wherein at least one of the first pair of sides and the second pair of sides each include a recessed portion for accepting a first pair of casters of a similar dolly stacked thereon.

11. A dolly comprising:
a deck having a lower surface, an upper support surface, a pair of lower support surfaces, a pair of transition surfaces connecting a corresponding one of the pair lower surfaces to the upper support surface, a first pair of opposing sides, and a second pair of opposing sides;
a plurality of casters extending from the lower surface of the deck; and
wherein at least one of the first pair of sides and the second pair of sides each include a recessed portion for accepting a first pair of casters of a similar dolly stacked thereon and wherein the pair of transition surfaces are sloped between the upper support surface and a corresponding one of the pair of lower support surfaces.

12. The dolly of claim 11, wherein the upper support surface includes a first plurality of troughs divided into segments with a first plurality of ribs.

13. The dolly of claim 12, wherein the plurality of troughs in the upper support surface extend into the pair of transition surfaces.

14. The dolly of claim 13, wherein each of the pair of lower surfaces include a second plurality of troughs separated into segments by a second plurality of ribs.

15. The dolly of claim 11, wherein the dolly stacked thereon is rotated 90 degrees thereto and each of the first pair of sides include a corresponding recessed portion located in a midportion of each of the first pair of sides and the recessed portion extends laterally into a corresponding one of the first pair of lower support surfaces and includes a semi-circular profile through a corresponding one of the first and second lower support surfaces and the lower surface.

16. The dolly of claim 11, wherein the pair of lower support surfaces include a first lower support surface adjacent one of the first pair of opposing sides and a second lower support surface adjacent another one of the first pair of opposing sides with the first lower support surface including a first pair of caster support recesses and the second lower support surface including a second pair of caster support recesses.

17. The dolly of claim 16, further including a first pair of walls extending upward from the first lower support surface along a corresponding one of the second pair of sides and a second pair of walls extending upward from the second lower support surface along a corresponding one of each of the second pair of sides.

18. The dolly of claim 17, wherein an upper edge of each of the first and second pair of walls is aligned with an uppermost surface of the upper support surface and each of the first and second pair of walls are laterally spaced from the upper support surface.

19. A dolly comprising;
a deck having a lower surface, and upper support surface, a first pair of opposing sides, a second pair of opposing sides, a first lower support surface, a second lower support surface, and a pair of transition surfaces connect opposing edges of the upper support surface with a corresponding one of the first and second lower support surfaces;

a plurality of casters extending from the lower surface of the deck;

wherein at least one of the first pair of sides and the second pair of sides each include a recessed portion for accepting a first pair of casters of a similar dolly stacked thereon and the dolly stacked thereon is rotated 90 degrees thereto and each of the first pair of sides include a corresponding recessed portion located in a midportion of each of the first pair of sides and the recessed portion extends laterally into a corresponding one of the first and second lower support surfaces.

20. A dolly comprising:

a desk having a lower surface, an upper support surface, a first pair of opposing sides, a second pair of opposing sides, a first lower support surface adjacent one of the first pair of opposing sides and a second lower support surface adjacent another one of the first pair of opposing sides with the first lower support surface including a first pair of caster support recesses and the second lower support surface including a second pair of caster support recesses;

a plurality of casters extending from the lower surface of the deck; and wherein at least one of the first pair of sides and the second pair of sides each include a recessed portion for accepting a first pair of casters of a similar dolly stacked thereon.

* * * * *

UNITED STATES PATENT AND TRADEMARK OFFICE
CERTIFICATE OF CORRECTION

PATENT NO. : 11,174,072 B2
APPLICATION NO. : 15/943989
DATED : November 16, 2021
INVENTOR(S) : Suzanne Whitfield Clark, Jon P. Hassell and Dane Gin Mun Kalinowski It is certified that error appears in the above-identified patent and that said Letters Patent is hereby corrected as shown below:

In the Claims

In Claim 8, Column 7, Line 41; replace "a desk having" with --a deck having--

In Claim 20, Column 9, Line 16; replace "a desk having" with --a deck having--

Signed and Sealed this
Seventeenth Day of May, 2022

*Katherine Kelly Vidal*

Katherine Kelly Vidal
*Director of the United States Patent and Trademark Office*